United States Patent
Kenny et al.

(10) Patent No.: US 11,919,193 B2
(45) Date of Patent: Mar. 5, 2024

(54) SYSTEM AND METHOD FOR TRACKING REINFORCEMENT MEMBER PLACEMENT IN AN ADDITIVELY MANUFACTURED STRUCTURE

(71) Applicant: General Electric Company, Schenectady, NY (US)

(72) Inventors: Christopher James Kenny, Schoharie, NY (US); Collin McKee Sheppard, Greenville, SC (US); Xiaopeng Li, Niskayuna, NY (US); Norman Arnold Turnquist, Carlisle, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 17/873,733

(22) Filed: Jul. 26, 2022

(65) Prior Publication Data
US 2024/0033967 A1 Feb. 1, 2024

(51) Int. Cl.
*B33Y 10/00* (2015.01)
*B28B 1/00* (2006.01)
(Continued)

(52) U.S. Cl.
CPC .......... *B28B 1/001* (2013.01); *B28B 17/0081* (2013.01); *B28B 21/56* (2013.01);
(Continued)

(58) Field of Classification Search
None
See application file for complete search history.

(56) References Cited

U.S. PATENT DOCUMENTS

| 8,801,415 B2 | 8/2014 | Khoshnevis |
| 9,566,742 B2 | 2/2017 | Keating et al. |

(Continued)

FOREIGN PATENT DOCUMENTS

| CN | 102853741 A | 1/2013 |
| CN | 110261915 B | 2/2021 |

(Continued)

OTHER PUBLICATIONS

Frangez et al, Depth-camera-based rebar detection and digital reconstruction for robotic concrete spraying, Construction Robotics (2021) 5:191-202 https://doi.org/10.1007/s41693-021-00063-y, Oct. 16, 2021 (Year: 2021).*

(Continued)

*Primary Examiner* — Yung-Sheng M Tsui
(74) *Attorney, Agent, or Firm* — Dority & Manning, P.A.

(57) ABSTRACT

The present application presents novel systems and methods for tracking reinforcement member placement in an additively manufactured structure that are simple, accurate, non-labor-intensive, and cost-effective. The present application also presents a novel method of manufacturing a tower structure comprising: depositing, via an additive printing system, a first printed layer of a wall with a printhead assembly, the wall at least partially circumscribing a vertical axis of the tower structure; positioning a first reinforcement member on the first printed layer; depositing, via the additive printing system, a second printed layer of the wall with the printhead assembly on the first reinforcement member, the second printed layer configured to hold a second reinforcement member thereon; and determining, via an optical sensor of the additive printing system, a position for placing the second reinforcement member based on the first reinforcement member positioning.

18 Claims, 14 Drawing Sheets

(51) Int. Cl.
| | |
|---|---|
| B28B 17/00 | (2006.01) |
| B28B 21/56 | (2006.01) |
| B33Y 30/00 | (2015.01) |
| B33Y 50/02 | (2015.01) |
| B33Y 80/00 | (2015.01) |

(52) U.S. Cl.
CPC ............. *B33Y 10/00* (2014.12); *B33Y 30/00* (2014.12); *B33Y 50/02* (2014.12); *B33Y 80/00* (2014.12)

(56) References Cited

U.S. PATENT DOCUMENTS

| | | |
|---|---|---|
| 10,810,734 B2 | 10/2020 | Salgian et al. |
| 2018/0093373 A1 | 4/2018 | Niederberger |
| 2021/0001542 A1* | 1/2021 | Villette ................. B29C 64/393 |
| 2022/0396005 A1* | 12/2022 | Lindemann ......... B28B 19/0015 |

FOREIGN PATENT DOCUMENTS

| | | | |
|---|---|---|---|
| EP | 4074920 A1 * | 10/2022 | |
| KR | 20040041243 A | 5/2004 | |
| KR | 101932227 B1 | 12/2018 | |
| WO | WO2021098197 A1 | 5/2021 | |
| WO | WO2021/101558 A1 | 5/2021 | |
| WO | WO2023/059311 A1 | 4/2023 | |

OTHER PUBLICATIONS

Casas et al., Fiber Optic Sensors for Bridge Monitoring, Journal of Bridge Engineering, vol. 8, Issue 6, Nov. 2003. https://ascelibrary.org/doi/abs/10.1061/(ASCE)1084-0702(2003)8:6(362).
Concrete Pro, Brochure: Laser Projection Systems for Production of Precast Concrete Parts, 8 Pages. Laser projectors for the precast concrete parts industry.
Contour Crafting, Civil Engineering Seminar Topics, Jun. 2016, 14 Pages. University of Southern California-Contour Crafting.
Fernandez et al., 3D FEM Model Development from 3D Optical Measurement Technique Applied to Corroded Steel Bars, Construction and Building Materials, vol. 124, 2016, pp. 519-532. https://www.sciencedirect.com/science/article/abs/pii/S0950061816312338.
Frangez et al., Depth-Camera-Based Rebar Detection and Digital Construction for Robotic Concrete Spraying, Construction Robotics, vol. 5, 2021, pp. 191-202.
Ji et al., A 3D Printed Ready-Mixed Concrete Power Distribution Substation: Materials and Construction Technology, Materials, vol. 12(9): 1540, 2019, 14 Pages. A 3D Printed Ready-Mixed Concrete Power Distribution Substation: Materials and Construction Technology.
Kloft et al., Reinforcement Strategies for 3D-Concrete-Printing, Civil Engineering Design, vol. 2, Issue 4, Aug. 2020, pp. 131-139. Reinforcement strategies for 3D-concrete-printing.
Khoshnevis, Automated Construction by Contour Crafting—Related Robotics and Information Technologies, Journal of Automation and Construction—Special Issue: The Best of ISARC 2002, vol. 13, Issue 1, Jan. 2004, pp. 5-19. Automated Construction By Contour Crafting—Related Robotics and Information Technologies.
Mason, Lase Projection Systems Improve Composite Ply Placement, Airtech Large Scale 3D Printing, 7 Pages. Laser Guided Play Assembly.
Mohan et al., Extrusion-Based Concrete 3D Printing from a Material Perspective: A State-of-the-art Review, Cement and Concrete Composites, vol. 115, Jan. 2021. (Abstract Only) Extrusion-based concrete 3D printing from a material perspective: A state-of-the-art review.
Nematollahi et al., Current Progress of 3D Concrete Printing Technologies, $34^{th}$ International Symposium on Automation and Robotics in Construction (ISARC 2017), 8 Pages. Current Progress of 3D Concrete Printing Technologies.
Nerella et al., Incorporating Reinforcement into Digital Concrete Construction, Conference: The annual Symposium of the IASS—International Association for Shell and Spatial Structures: Creativity in Structural Design At: MIT, Cambridge, Jul. 2018, 9 Pages. Incorporating reinforcement into digital concrete construction.
Omuro et al., Three-Dimensional Printing of Continuous Carbon Fiber Reinforced Thermoplastics by In-Nozzle Impregnation with Compaction Roller, Materials Science Engineering, $21^{st}$ International Conference on Composite Materials Xi'an, 2017, 6 Pages. Three-dimensional Printing Of Continuous Carbon Fiber Reinforced Thermoplastics By In-nozzle Impregnation With Compaction Roller.
Tang et al., A Review on Fiber Optic Sensors for Rebar Corrosion Monitoring in RC Structures, Construction and Building Materials, vol. 313, Dec. 27, 2021, 125578. https://www.sciencedirect.com/science/article/abs/pii/S0950061821033158 (Abstract Only).
Ueda et al., 3D Compaction Printing of a Continuous Carbon Fiber Reinforced Thermoplastic, Composites Part A: Applied Science and Manufacturing, vol. 137, Oct. 2020. (Abstract Only) 3D compaction printing of a continuous carbon fiber reinforced thermoplastic.
European Search Report Corresponding to EP23183661.0, dated Dec. 4, 2023.

* cited by examiner

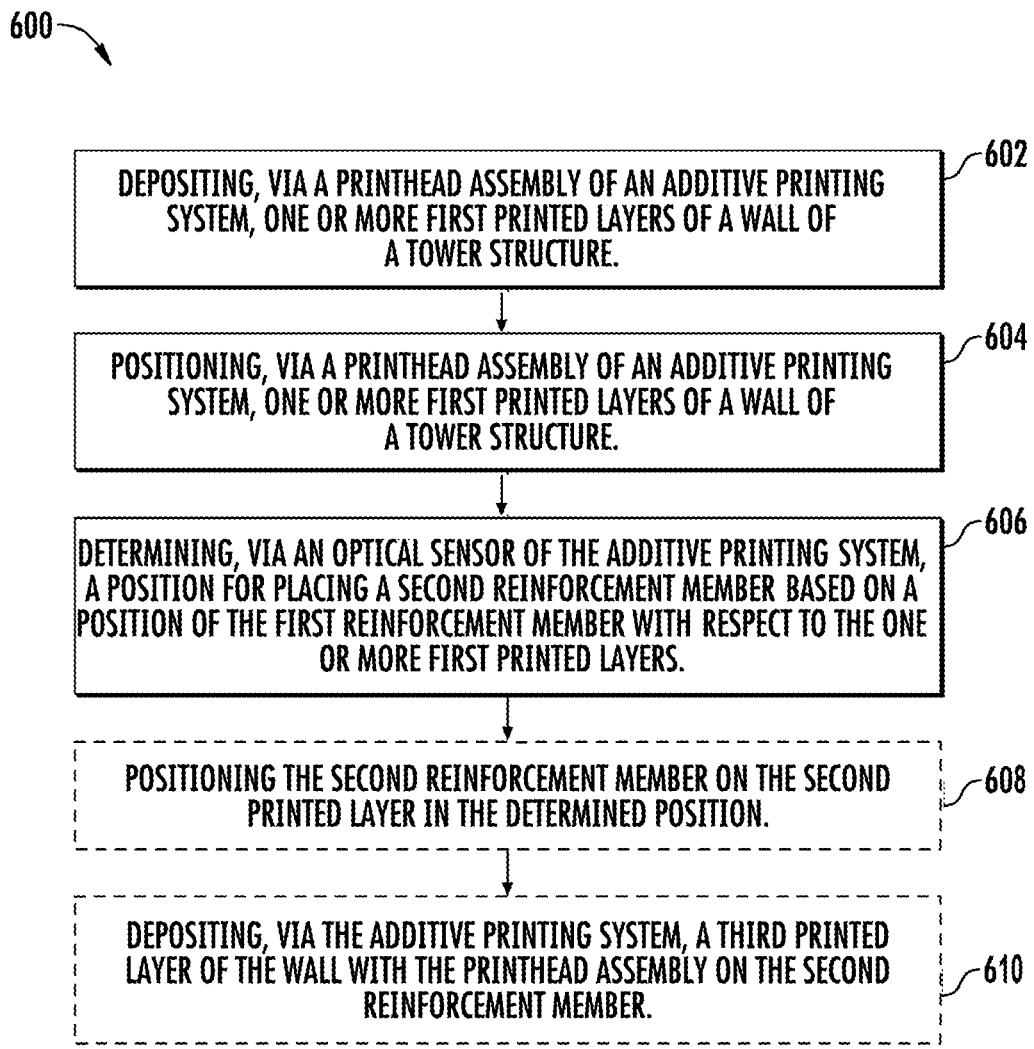

SYSTEM AND METHOD FOR TRACKING REINFORCEMENT MEMBER PLACEMENT IN AN ADDITIVELY MANUFACTURED STRUCTURE

STATEMENT REGARDING FEDERALLY SPONSORED RESEARCH OR DEVELOPMENT

This invention was made with Government support under Contract No. DE-EE0009059 awarded by the U.S. Department of Energy (DOE). The Government has certain rights in the invention.

FIELD

The present disclosure relates in general to additively manufactured structures and methods, and more particularly to systems and methods for tracking reinforcement member placement in additively manufactured structures, such as a portion of a wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, certain conventional manufacturing method include forming pre-cast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g., via bolting and/or welding. Such methods, however, require extensive labor and can be time-consuming.

In view of the foregoing, the art is continually seeking improved methods for manufacturing wind turbine towers. For example, more recently, progress has been made in the construction of wind turbine towers, at least in part, using additive manufacturing techniques. Such methods allow for the tower structures to be erected on site and also allows the structures to be built to taller heights.

Accurate placement of reinforcement members in additively-printed concrete structures is an important factor in assuring structural integrity. In addition, a record of rebar placement is necessary for code compliance. In printed concrete structures, the reinforcement member placement is completed in conjunction with the printing process, with reinforcement member placement alternating with the printing of the concrete layers (which differs from a poured concrete structure, wherein the entire rebar cage is in place relative to formwork). Thus, placement of the reinforcement members during the additive manufacturing process in a fast, reliable, and efficient manner has proven to be a difficult task. Therefore, precise tracking of rebar placement is not easy or feasible in the art. In addition, reinforcement member placement is difficult to automate and to track, as the reinforcement members (e.g., rebar, tension cables, etc.) are usually placed in opposing orientations and positions due to the geometry and structure of the rebar cages.

Accordingly, the present disclosure is directed to a method for tracking reinforcement member placement in an additively manufactured structure that addresses the aforementioned issues, and more particularly to a method for tracking reinforcement member placement when additively manufacturing a tower base or tower of a wind turbine.

BRIEF DESCRIPTION

Aspects and advantages of the present disclosure will be set forth in part in the following description, or may be obvious from the description, or may be learned through practice of the present disclosure.

In an aspect, the present disclosure is directed to a method of manufacturing a tower structure. The method includes depositing, via a printhead assembly of an additive printing system, one or more first printed layers of a wall of a tower structure. The method also includes positioning a first reinforcement member with respect to the one or more first printed layers of the wall. The method also includes determining, via an optical sensor of the additive printing system, a position for placing a second reinforcement member based on a position of the first reinforcement member with respect to the one or more first printed layers.

In another aspect, the present disclosure is directed to a method of manufacturing a tower structure. The method includes depositing, via an additive printing system, a first printed layer of a wall with a printhead assembly, the wall at least partially circumscribing a vertical axis of the tower structure. The method also includes positioning a first reinforcement member on the first printed layer. The method includes depositing, via the additive printing system, a second printed layer of the wall with the printhead assembly on the first reinforcement member. The method further includes placing a second reinforcement member on the second printed layer. The method also includes determining, via a controller of the additive printing system, a position for placing the second reinforcement member based on the first reinforcement member positioning. Further, the method includes positioning the second reinforcement member on the second printed layer in the determined position. In addition, the method includes depositing, via the additive printing system, a third printed layer of the wall with the printhead assembly on the second reinforcement member.

In still another aspect, the present disclosure is directed to an additive printing system for manufacturing a tower structure. The additive printing system includes a support structure, an optical sensor, a printhead assembly operably coupled to the support structure, and a controller communicatively coupled to the printhead assembly and the optical sensor. The controller includes at least one processor configured to perform or direct a plurality of operations. The plurality of operations include, but are not limited to, depositing a first printed layer of the wall with the printhead assembly. In addition, the plurality of operations also include optically scanning the first printed layer, via the optical sensor, during depositing of the first printed layer by the printhead assembly. The plurality of operations further include depositing a second printed layer of the wall with the printhead assembly atop the first printed layer, the first printed layer including a first horizontal reinforcement assembly positioned in a horizontal orientation, the second printed layer configured to hold a second horizontal reinforcement assembly thereon. The plurality of operations also include generating a three-dimensional map of the first printed layer based on the optical scan. Further, the plurality of operations include determining a position for placing the second horizontal reinforcement assembly based on the three-dimensional map of the first printed layer.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 14 illustrates a flow diagram of an embodiment of a method for manufacturing an additively manufactured structure according to the present disclosure.

Figure 1:
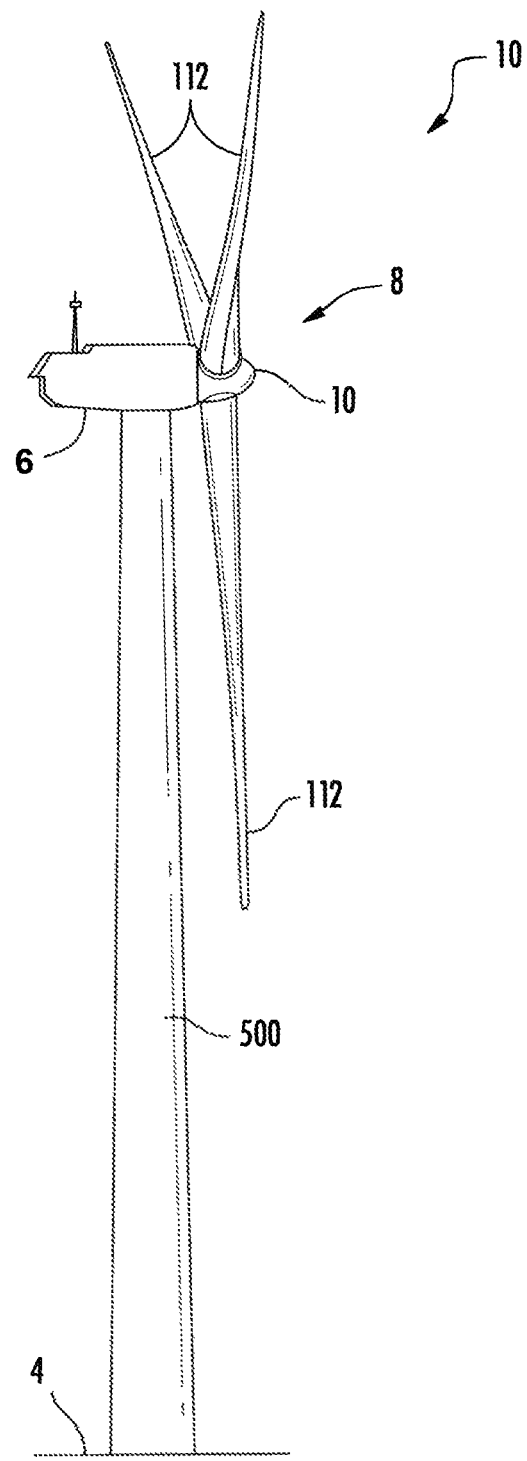
FIG. 1 illustrates a perspective view of an embodiment of a wind turbine according to the present disclosure.

Repeat use of reference characters in the present specification and drawings is intended to represent the same or analogous features or elements of the present disclosure.

DETAILED DESCRIPTION

Reference now will be made in detail to embodiments of the present disclosure, one or more examples of which are illustrated in the drawings. Each example is provided by way of explanation of the present disclosure, not limitation of the present disclosure. In fact, it will be apparent to those skilled in the art that various modifications and variations can be made in the present disclosure without departing from the scope or spirit of the present disclosure. For instance, features illustrated or described as part of an embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to additively manufactured structures, additive manufacturing systems, and additive manufacturing methods for manufacturing a tower structure, such as a wind turbine tower. "Additively manufactured structures" as used herein refers to structures formed using automated deposition of sequential layers (e.g., print layers) of cementitious material, such as concrete, and/or other construction materials, via "additive manufacturing" technologies such as additive manufacturing, 3-D printing, spray deposition, extrusion additive manufacturing, concrete printing, automated fiber deposition, as well as other techniques that utilize computer numerical control and multiple degrees of freedom to deposit material.

"Additive manufacturing" as used herein refers to processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers but are also capable of printing curved and/or irregular shapes.

In order to achieve the requisite structural strength for modern large-scale construction, additively manufactured structures generally require reinforcement. Known methods for reinforcing wind turbine towers often utilize vertical rebar and/or a rebar cage. For example, a common construction practice is to manually place a prefabricated rebar cage in the desired location prior to pouring concrete. While such approaches may reinforce the tower structure, they are often labor intensive and costly, and may not be compatible with construction via additive manufacturing. Additionally, known methods of reinforcing an additively manufactured structure may not accurately place the reinforcing elements in an optimal position within the structure. Accordingly, the present application presents novel systems and methods for tracking reinforcement member placement in an additively manufactured structure that are simple, accurate, non-labor-intensive, and cost-effective.

For example, in an embodiment, the present disclosure is directed to a novel method of manufacturing a tower structure that includes depositing, via a printhead assembly of an additive printing system, one or more first printed layers of a wall of the tower structure, positioning a first reinforcement member with respect to the one or more first printed layers of the wall, and determining, via an optical sensor of the additive printing system, a position for placing a second reinforcement member based on a position of the first reinforcement member with respect to the one or more first printed layers. In particular, the actual physical dimensions and the particular placement, positioning, and/or orientation of the first reinforcement member(s) may be optically scanned, tracked, and/or mapped. This information may be used to generate a visual representation or a three-dimensional map, for example, of the placement, positioning, and/or orientation of the reinforcement member(s)

In an embodiment, the determined, tracked, and mapped position of the first reinforcement member(s), with respect to the first printed layer(s) of the wall of the tower structure, may then be used to screen and select from amongst various reinforcement members for the best fit or most applicable second reinforcement member(s). The determined, tracked, and mapped position of the first reinforcement member(s) may also be used to custom form or design (digitally or physically) the second reinforcement member(s). Moreover, the determined, tracked, and mapped position of the first reinforcement member(s) also may be used to place or position the second reinforcement member(s) relative to the first reinforcement member(s), or relative the first printed layer(s), before additional printed layer(s) are added thereon. In other words, the dimensions, placement, and position of the second reinforcement member(s) may be tailored to the determined, tracked, and mapped position of the first reinforcement member(s).

Referring now to the drawings, FIG. 1 illustrates a perspective view of an embodiment of a tower structure 500 according to the present disclosure. As depicted in FIG. 1, the tower structure may be a component of a wind turbine 10. As shown, the wind turbine 10 generally includes a tower structure 500 extending from a support surface 4, a nacelle 6, mounted on the tower structure 500, and a rotor 108 coupled to the nacelle 6. The rotor 8 includes a rotatable hub 10 and at least one rotor blade 112 coupled to and extending outwardly from the hub 10. For example, in the illustrated embodiment, the rotor 8 includes three rotor blades 112. However, in an alternative embodiment, the rotor 8 may include more or less than three rotor blades 112. Each rotor blade 112 may be spaced about the hub 10 to facilitate rotating the rotor 8 to enable kinetic energy to be transferred from the wind into usable mechanical energy, and subsequently, electrical energy. For instance, the hub 10 may be rotatably coupled to an electric generator (not shown) positioned within the nacelle 6 to permit electrical energy to be produced.

It should be appreciated that while discussed herein in reference to a wind turbine tower, the present disclosure is not limited to wind turbine towers but may be utilized in any application having concrete construction and/or tall tower structures. For example, the present disclosure may be utilized in the additive manufacturing of homes, buildings, portions of buildings, bridges, towers, poles, and other aspects of the concrete industry. Further, the methods described herein may also apply to manufacturing any similar structure that benefits from the advantages described herein, e.g., a wind turbine support tower, a cooling tower, a communications tower, a bridge pylon, a smokestack, a transmission tower, an observation tower, a dwelling, an office, an ornamental tower, a water tower, and/or other similar structures.

Figure 2:
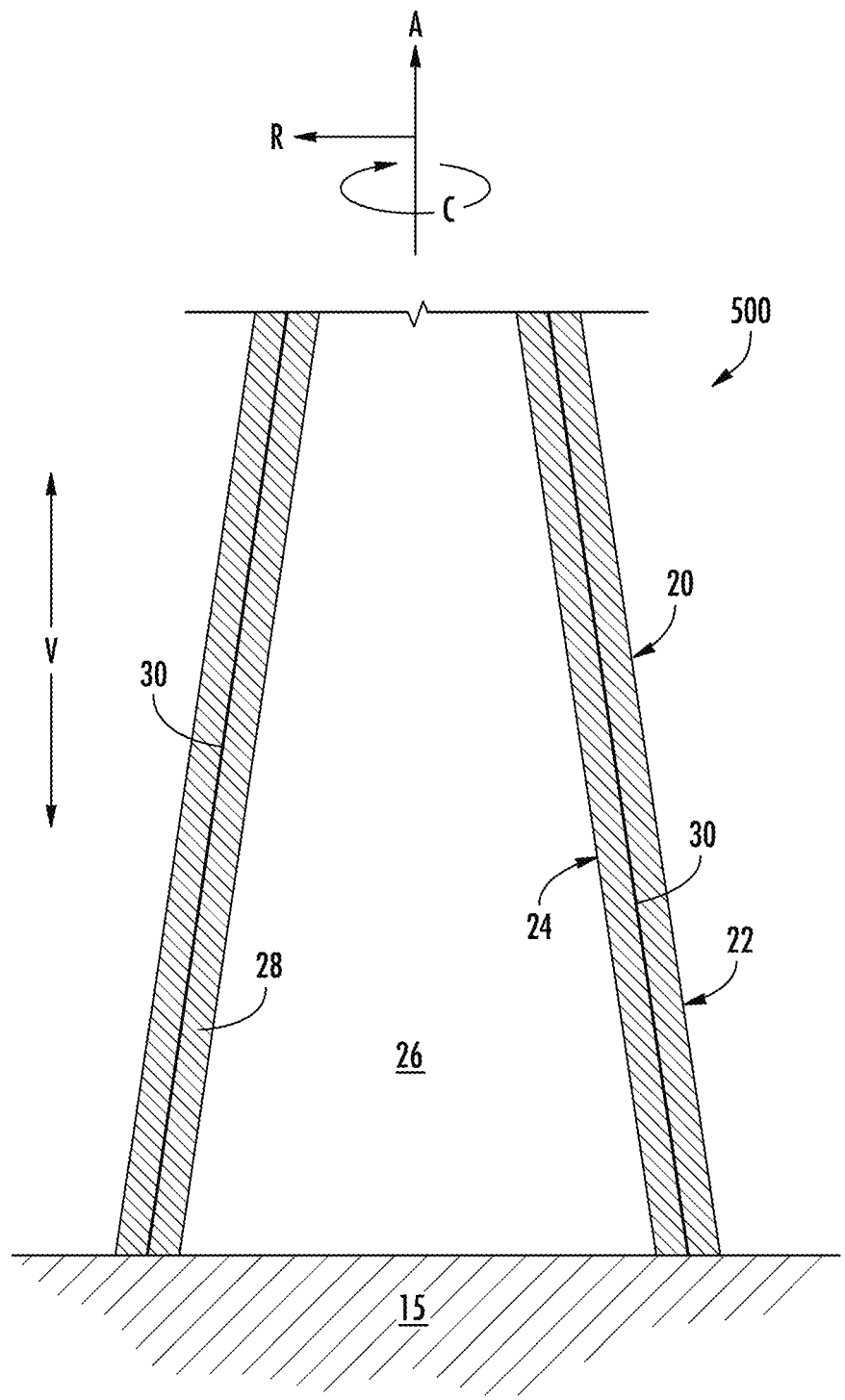
FIG. 2 illustrates a partial, cross-sectional view of an embodiment of a tower structure of a wind turbine according to the present disclosure.

Referring now to FIG. 2, the tower structure 500 of the wind turbine 10 of FIG. 1 is described in more detail according to an embodiment of the present disclosure. Specifically, FIG. 2 illustrates a partial, cross-sectional view of an embodiment of the tower structure 500 of the wind turbine 10 according to the present disclosure. As shown, the tower structure 500 defines a generally circumferential tower wall 20 having an outer surface 22 and an inner surface 24. Further, as shown, the circumferential tower wall 20 generally defines a hollow interior 26 that is commonly used to house various turbine components (e.g., a power converter, transformer, etc.). Moreover, in an embodiment, the tower structure 500 is formed using additive manufacturing.

Furthermore, as shown, the tower structure 500 may be formed of one or more cementitious materials 28 reinforced with one or more reinforcement members 30, such as elongated cables or wires, helical cables or wires, reinforcing bars (also referred to as rebar), mesh reinforcing fibers (metallic or polymeric), reinforcing metallic rings (circular, oval, spiral and others as may be relevant), and/or couplings. According to an embodiment, the cementitious material 28 may be provided through any suitable supply system 32 (see, e.g., FIG. 4). Further, the reinforcement members 30 may be precisely placed, tracked, mapped, and embedded in the cementitious material 28 during the printing process, as described in detail herein. As used herein, the cementitious materials 28 may include any suitable workable paste that is configured to bind together after curing to form a structure. Suitable cementitious materials include, for example, concrete, pitch resin, asphalt, geopolymers, polymers, cement, mortar, cementitious compositions, or similar materials or compositions.

According to an embodiment of the present disclosure, an adhesive material (not shown), a cold joint primer (not shown), and/or steel/metal/alloy/composite frame(s) or end cap(s) in the form of C-shaped frames, for example, (not shown) may also be provided between one or more of the cementitious materials 28 and the foundation 15, the cementitious material 28 and reinforcement members 30, or multiple layers of the cementitious material 28 and reinforcement members 30. Thus, these materials may further supplement or complement interlayer bonding between materials, facilitate integration or use of pre-fabricated components or formwork, or simply provide aesthetic benefits (e.g., capping off the rough edges of an additively manufactured wall of cementitious material 28 in a tower structure 500).

"Adhesive material" as used herein refers to cementitious material such as mortar, polymeric materials, and/or admixtures of cementitious material and polymeric material. Adhesive formulations that include cementitious material are referred to herein as "cementitious mortar." "Cementitious mortar" as used herein refers to any cementitious material that may be combined with fine aggregate. Cementitious mortar made using Portland cement and fine aggregate is sometimes referred to as "Portland cement mortar," or "OPC." Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

Polymeric materials that may be utilized in an adhesive formulation include any thermoplastic or thermosetting polymeric material, such as acrylic resins, polyepoxides, vinyl polymers (e.g., polyvinyl acetate (PVA), ethylene-vinyl acetate (EVA)), styrenes (e.g., styrene butadine), as well as copolymers or terpolymers thereof. Characteristics of certain polymeric materials are described in ASTM C1059/C1059M-13, Standard Specification for Latex Agents for Bonding Fresh to Hardened Concrete.

Figure 3:
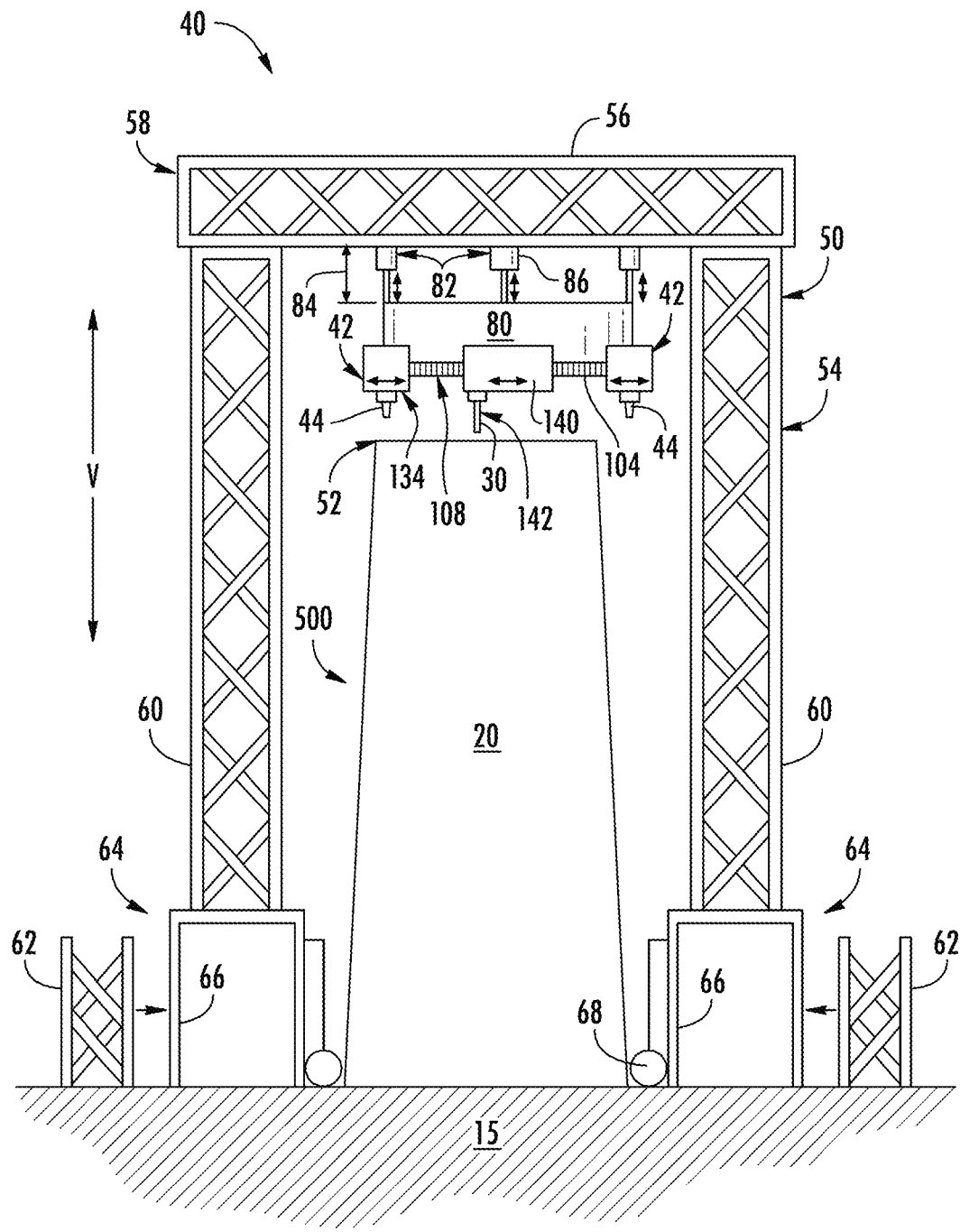
FIG. 3 illustrates a schematic view of an embodiment of an additive printing system being used to print structures according to the present disclosure.
Figure 4:
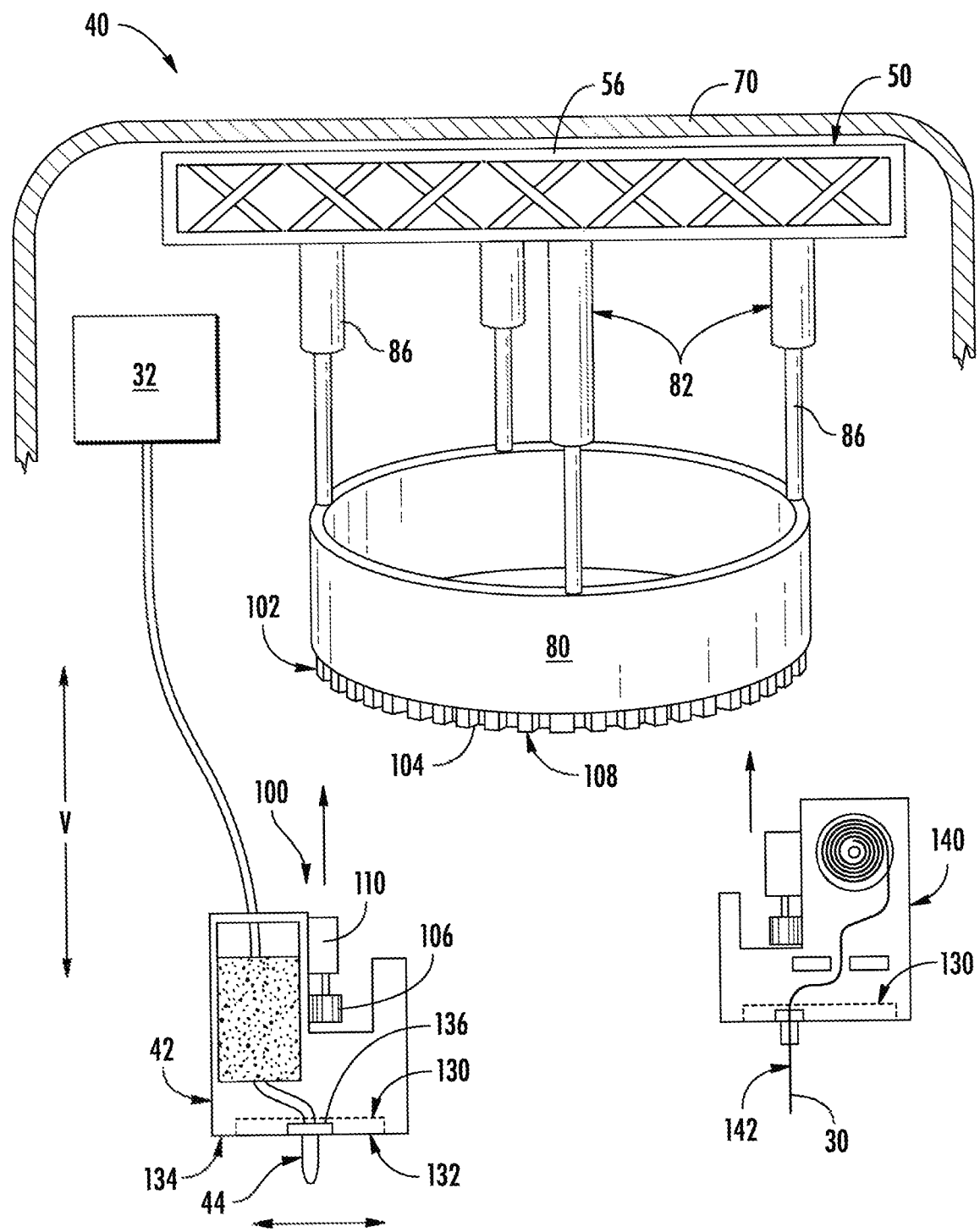
FIG. 4 illustrates a close-up view of certain components of the additive printing system of FIG. 3 according to the present disclosure.
Figure 5:
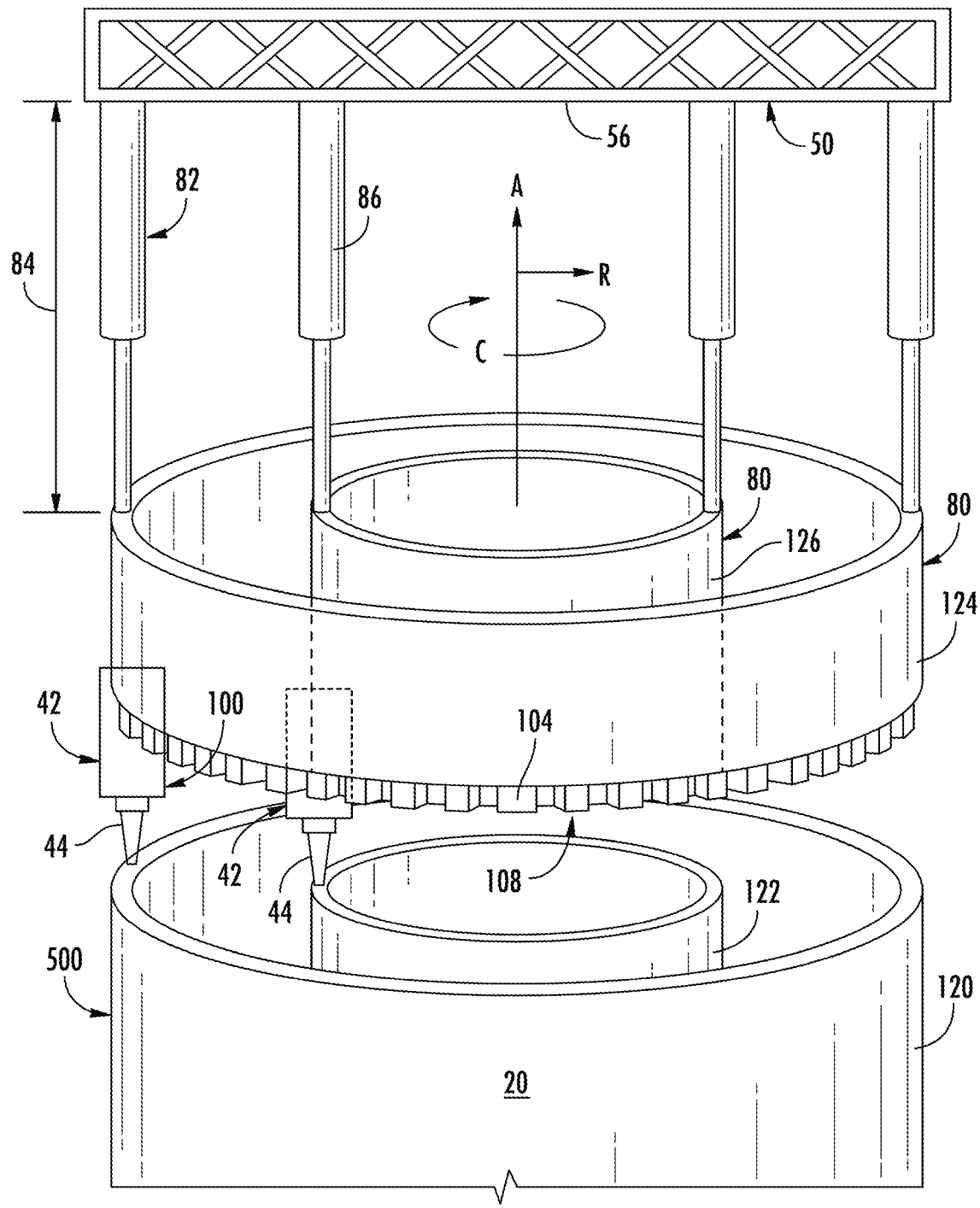
FIG. 5 illustrates another close-up view of an embodiment of certain components of an additive printing system according to the present disclosure.

Referring now to FIGS. 3-5, an additive printing system 40 is illustrated according to an embodiment of the present disclosure. Notably, all or part of tower structure 500 of FIGS. 1-2 may be printed, layer-by-layer, using the additive printing system 40, which may use any suitable mechanisms for depositing layers of additive material, such as concrete, to form the tower structure 500. The additive printing system 40 has one or more nozzles for depositing material onto the surface 15. The nozzles are controlled by a controller to form an object programmed within the controller processor (such as a CAD file; described in detail herein). More specifically, as shown in FIG. 3 and described herein, the additive printing system 40 includes one or more printer heads 42 having any suitable number of nozzles 44 and being independently movable to simultaneously print layers of the tower structure 500.

More specifically, and again referring to FIGS. 3-5, the additive printing system 40 may include a vertical support structure 50 which is generally configured for suspending one or more of the printer heads 42 above the tower structure 500 during the printing process. In this regard, the vertical support structure 50 may extend from the ground or from foundation 15 upwards substantially along a vertical direction V to a position at least partially above a top 52 of the tower structure 500 (e.g., and also above foundation 15 before the first layer is printed).

As illustrated, the vertical support structure 50 may include a plurality of support towers 54 and one or more gantry beams 56 that extend between at least two of the support towers 54. Although two support towers 54 and a single gantry beam 56 are illustrated in the FIGS. 3-5, it should be appreciated that any suitable number and position of support towers 54 may be used according to alternative embodiments. In addition, the support towers 54 and the gantry beams 56 are illustrated as being truss-like structures (e.g., similar to a tower crane), but could be formed in any other suitable manner or have any other configuration according to alternative embodiments.

In addition, although the vertical support structure 50 is illustrated as being positioned on the outside of the tower structure 500, it should be appreciated that according to alternative embodiments, the vertical support structure 50 may be positioned inside the tower structure 500. According to still other embodiments, the vertical support structure 50 may include the support towers 54 positioned both inside and outside of the tower structure 500. In addition, the additive printing system 40 may be suspended from the vertical support structure 50 using any other suitable system or mechanism.

Notably, during the additive printing process, the top 52 of tower structure 500 is built layer-by-layer, rising along the vertical direction V. Therefore, the vertical support structure 50 may be an expandable support structure which may be raised along with the height of tower structure 500. In this regard, the vertical support structure 50 may be formed from a plurality of stacked segments 60 which are positioned adjacent each other along the vertical direction V and joined to form the rigid vertical support structure 50. Thus, when the tower structure 500 approaches the top 58 of the vertical support structure 50, additional segments 62 may be added to stacked segments 60 to raise the overall height of vertical support structure 50.

Referring specifically to FIG. 3, additional segments 62 may be combined with stacked segments 60 to raise the vertical support structure 50 using a jacking system 64. In general, as shown, the jacking system 64 may be positioned proximate foundation 15 and is configured for raising the vertical support structure 50 (e.g., including the stacked segments 60 and the gantry beams 56) and inserting additional segments 62. Specifically, a separate jacking system 64 may be positioned at a bottom of each support tower 54.

According to an embodiment, the jacking system 64 may include a jacking frame 66 and a jacking mechanism 68 which are positioned at the bottom of stacked segments 60. The jacking mechanism 68 described herein may generally be any suitable hydraulically, pneumatically, or other mechanically actuated system for raising the vertical support structure 50. Accordingly, when additional segments 62 need to be added, a dedicated jacking mechanism 68 simultaneously raises each of the support towers 54 such that additional segments 62 may be inserted. Specifically, the jacking frame 66 may support the weight of the vertical support structure 50 as additional segments 62 are positioned below the lowermost stacked segments 60. Additional segments 62 are joined to stacked segments 60 using any suitable mechanical fasteners, welding, etc. This process may be repeated as needed to raise the total height of the vertical support structure 50.

In certain situations, it may be desirable to protect the tower structure 500 and components of the additive printing system 40 from the external environment in which they are being used. In such embodiments, the tower cover 70 may generally be any suitable material positioned around the vertical support structure 50. For example, the tower cover 70 may be a fabric-like material draped over or attached to the vertical support structure 50 (e.g., over the support towers 54 and/or the gantry beams 56).

As mentioned above, the vertical support structure 50 is generally configured for supporting one or more of the printer heads 42 and or other modules which facilitate the formation of the tower structure 500. Referring specifically to FIGS. 3 through 5, the additive printing system 40 may further include one or more support members, such as support rings 80, that are suspended from the vertical support structure 50, or more specifically from gantry beams 56, above the tower structure 500. For example, as illustrated, the support ring 80 is mounted to the gantry beam 56 using a vertical positioning mechanism 82. In general, the vertical positioning mechanism 82 is configured for adjusting a height or vertical distance 84 measured between the gantry beam 56 and a top of support ring 80 along the vertical direction V. For example, the vertical positioning mechanism 82 may include one or more hydraulic actuators 86 extending between gantry beam 56 and support ring 80 for moving support ring 80 and printer heads 42 along the vertical direction V as tower structure 500 is built up layer-by-layer.

As illustrated, the hydraulic actuators 86 are configured for adjusting the vertical distance 84 to precisely position nozzles 44 of the printer heads 42 immediately above top 52 of the tower structure 500. In this manner, the additive printing process may be precisely controlled. However, it should be appreciated that according to alternative embodiments, the vertical motion of the printer heads 42 may be adjusted in any other suitable manner. For example, according to an embodiment, the support ring 80 may be rigidly fixed to the gantry beam 56 while the support ring 80 and/or the printer heads 42 are used to facilitate vertical motion to precisely position nozzles 44. For example, the printer heads 42 may be slidably mounted to the support ring 80 using a vertical rail and positioning mechanism to adjust the vertical position relative to the support ring 80 and the tower structure 500.

According to the illustrated embodiment, the printer head(s) 42 is movably coupled to the support ring 80 such that the nozzles 44 may deposit cementitious material 28 around a perimeter of tower structure 500 while the support ring 80 remains rotationally fixed relative to gantry beam 56. In this regard, for example, a drive mechanism 100 may operably couple the printer head(s) 42 to the support ring 80 such that printer head(s) 42 may be configured for moving around a perimeter 102 of the support ring 80 (e.g., about a circumferential direction C) while selectively depositing the cementitious material 28. One exemplary drive mechanism 100 is described below and illustrated in the figures, but it should be appreciated that other drive mechanisms are contemplated and within the scope of the present disclosure.

As best shown in FIG. 4, for example, the drive mechanism 100 may include a ring gear 104 that is positioned on the support ring 80 and a drive gear 106 that is rotatably mounted to printer head 42. Specifically, as illustrated, the ring gear 104 is defined on a bottom 108 of the support ring 80. Thus, when printer head(s) 42 42 is mounted on the bottom 108 of support ring 80, drive gear 106 engages ring gear 104. The drive mechanism 100 may further include a drive motor 110 that is mechanically coupled to the drive gear 106 for selectively rotating the drive gear 106 to move printer head(s) 42 around a perimeter 102 of the support ring 80. In this manner, the support ring 80 may remain stationary while printer head(s) 42 moves around the support ring 80 while depositing the cementitious material 28 to form a cross-sectional layer of tower structure 500.

Although the drive mechanism 100 is illustrated herein as a rack and pinion geared arrangement using drive gear 106 and ring gear 104, it should be appreciated that any other suitable drive mechanism 100 may be used according to alternative embodiments. For example, the drive mechanism 100 may include a magnetic drive system, a belt drive system, a frictional roller drive system, or any other mechanical coupling between printer head(s) 42 and support ring 80 which permits and facilitates selective motion between the two.

In addition, in an embodiment, the support ring 80 may generally have a diameter that is substantially equivalent to a diameter of the tower structure 500. However, it may be desirable to print the tower structure 500 having a non-fixed diameter or a tapered profile. In addition, as illustrated for example in FIG. 5, the tower structure 500 may include an outer tower wall 120 spaced apart along a radial direction R from an inner tower wall 122. For example, the outer tower wall 120 may be printed to define a mold for receiving poured concrete, e.g., to decrease printing time and total construction time.

Thus, as shown in FIG. 5, the additive printing system 40 may include a plurality of concentric support rings 80 and printer heads 42 for simultaneously printing each of the outer tower wall 120 and the inner tower wall 122. Specifically, as illustrated, an outer support ring 124 may be positioned above the outer tower wall 120 and have a substantially equivalent diameter to the outer tower wall 120. Similarly, the inner support ring 126 may be positioned above the inner tower wall 122 and have a substantially equivalent diameter to the inner tower wall 122. According to this embodiment, each of outer support ring 124 and inner support ring 126 may include dedicated printer heads 42 and/or other modules for facilitating the printing process of outer tower wall 120 and inner tower wall 122, respectively.

Referring again to FIG. 4, the printer head(s) 42 may include mechanisms for adjusting the position of nozzles 44 on printer head(s) 42. For example, printer head(s) 42 may include a radial adjustment mechanism 130 that is configured for moving print nozzle 44 along the radial direction R. Specifically, according to the illustrated embodiment, radial adjustment mechanism 130 includes a slide rail 132 mounted to a bottom 134 of printer head 42. The slide rail 132 extends substantially along the radial direction and is configured for slidably receiving the nozzle 44.

The radial adjustment mechanism 130 may further include an actuating mechanism 136 that moves print nozzle 44 along the radial direction R within the slide rail 132. For example, the actuating mechanism 136 may include any suitable actuator or positioning mechanism for moving nozzle 44 within the slide rail 132. In this regard, for example, the actuating mechanism 136 may include one or more of a plurality of linear actuators, servomotors, track conveyor systems, rack and pinion mechanisms, ball screw linear slides, etc.

Referring still to FIGS. 4 and 5, the additive printing system 40 may include any other suitable number of subsystems or modules to facilitate and improved printing process or improved finishing of tower structure 12. For example, as illustrated in FIG. 4, the additive printing system 40 may include a reinforcement module 140 which is movably coupled to the support ring 80 and is configured for embedding one or more reinforcement members 142 at least partially within tower structure 12. In this regard, for example, the reinforcement module 140 may be similar to the printer head(s) 42 in that engages the support ring 80 and may move around a perimeter 102 of the support ring 80 while depositing the reinforcement members 142.

For example, according to an embodiment, the reinforcement members 142 may be reinforcement bars (i.e., rebar), tensioning cables, or any other suitable structural reinforcement members, as explained briefly below. For example, as shown in FIG. 2, the reinforcement module 140 may embed one or more reinforcement members 30 at least partially within one or more of portions of the tower structure 12. In this regard, the reinforcement module 140 positions reinforcement members 30 at least partially within the tower structure 12. It should be understood that such reinforcement members 30 may extend along the entire height of the tower structure 500 (e.g., as shown in FIG. 2) or along only a portion of the tower height.

Similarly, referring still to FIGS. 3 and 4, the additive printing system 40 also may be configured to supply backfill material, for example, via a mechanism movably coupled to the support ring 80 and configured for depositing backfill material and/or any other material as described herein. In this regard, for example, such a mechanism may be similar to the printer head(s) 42 and/or reinforcement module 140 in that it engages the support ring 80 and may move around a perimeter 102 of the support ring 80 while depositing a backfill material. For example, according to an embodiment, the backfill material described herein may include any suitable workable paste that is configured to bind together after curing to form a structure. Suitable materials include, for example, concrete, pitch resin, asphalt, clay, cement, mortar, cementitious compositions, geopolymer materials, polymer materials, or similar materials or compositions.

Referring now to FIGS. 6-12, various views of another embodiment of a tower structure 500 and another embodiment of an additive printing system 300 are illustrated. As shown, the tower structure 500 may be formed by depositing one or more layers of a wall 502 with a printhead assembly 302 of the additive printing system 300. In an embodiment, as shown, the wall 502 may circumscribe or at least partially circumscribe (for example, to accommodate an access opening) a vertical axis ($V_A$) of the tower structure 500. Each wall 502 may for example, be one of a plurality of print layers in an axially aligned arrangement to form the tower structure 500. In addition, as is described herein, the tower structure 500 may be formed using at least one cementitious material 506.

Figure 6:
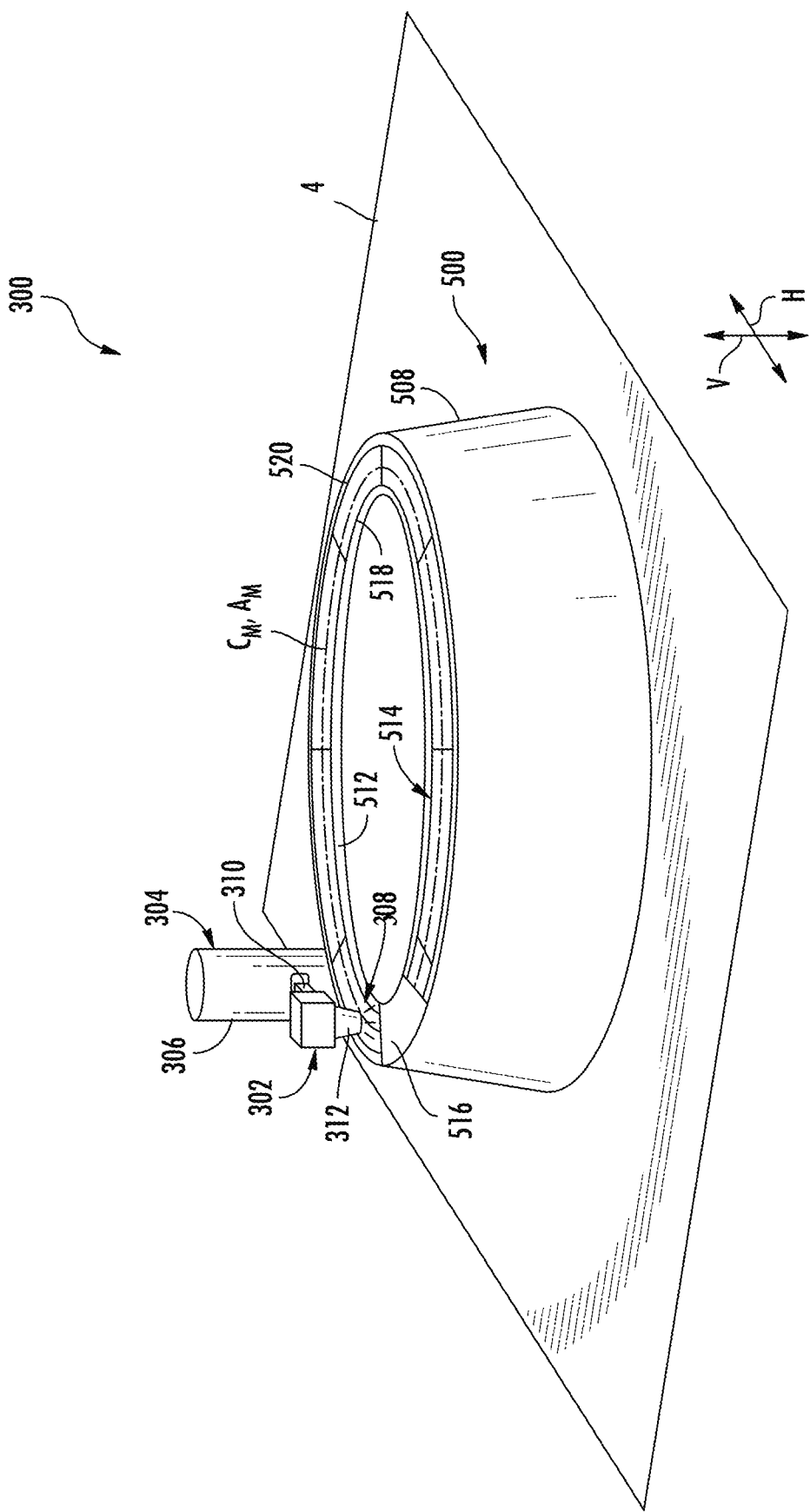
FIG. 6 illustrates a perspective view of another embodiment of an additive printing system being used to print the structures according to the present disclosure.

As depicted in the partial overhead view of the tower 500 illustrated in FIG. 6, the wall 502 may, in an embodiment, have an outer circumferential face 508 corresponding to each layer of the wall 502. The outer circumferential face 508 may have a maximal radial distance from the vertical axis ($V_A$). The outer circumferential face 508 may, for example, be generally circular, circumscribing the vertical axis ($V_A$).

In an embodiment, the wall 502 may have an inner circumferential face 510 corresponding to each layer of the wall 502. The inner circumferential face 510 may have a minimal radial distance from the vertical axis. The inner circumferential face 510 may, for example, be generally circular, circumscribing the vertical axis.

Figure 7:
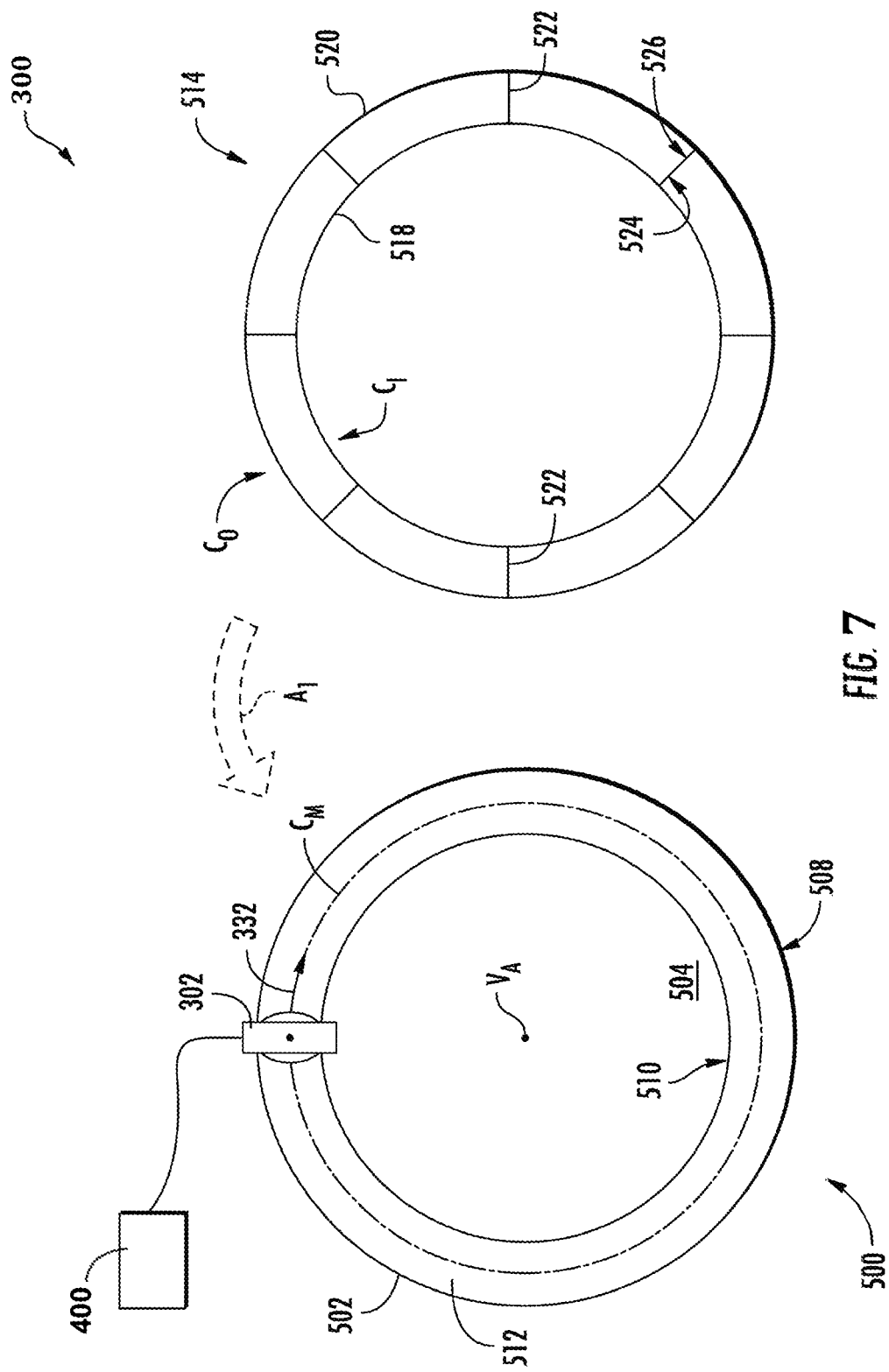
FIG. 7 illustrates a top plan view of certain components of the additive printing system of FIG. 6 according to the present disclosure and an assembled reinforcement member.

As depicted in the overhead view (e.g., layer view) of the tower 500 illustrated in FIG. 7, an embodiment of a reinforcement member 514 in the form of a reinforcement assembly may be positioned on the first printed layer 512 (as depicted by arrow $A_1$). FIG. 6, therefore, illustrates the process of forming the tower 500 following placement and/or positioning of the reinforcement member 514 on the first printed layer 512. FIG. 6 also illustrates a portion of the second printed layer 516 deposited on the reinforcement member 514.

The reinforcement member 514 may, in an embodiment, include an inner rail 518, an outer rail 520, and/or a plurality of transverse members 522. Each transverse member 522 may have a first end 524 coupled to the inner rail 518. In an embodiment, each transverse member 522 may have a second end 526 coupled to the outer rail 520. It should be appreciated that the inner rail 518 and/or the outer rail 520 may have a shape corresponding to a horizontal shape of the first printed layer. For example, in an embodiment wherein the tower structure 500 has a generally cylindrical or conical shape, the inner rail 518 and/or the outer rail 520 may be generally circular. By way of an additional example, in an embodiment wherein the tower structure 500 has a generally polygonal shape, the inner rail 518 and/or the outer rail 520 may include a plurality of angles/corners joined by a plurality of straight and/or curved sections. In such an embodiment, the inner rail 518 and/or the outer rail 520 may have a shape which mirrors the plurality of angles/corners joined by the plurality of straight and/or curved sections.

Figure 8:
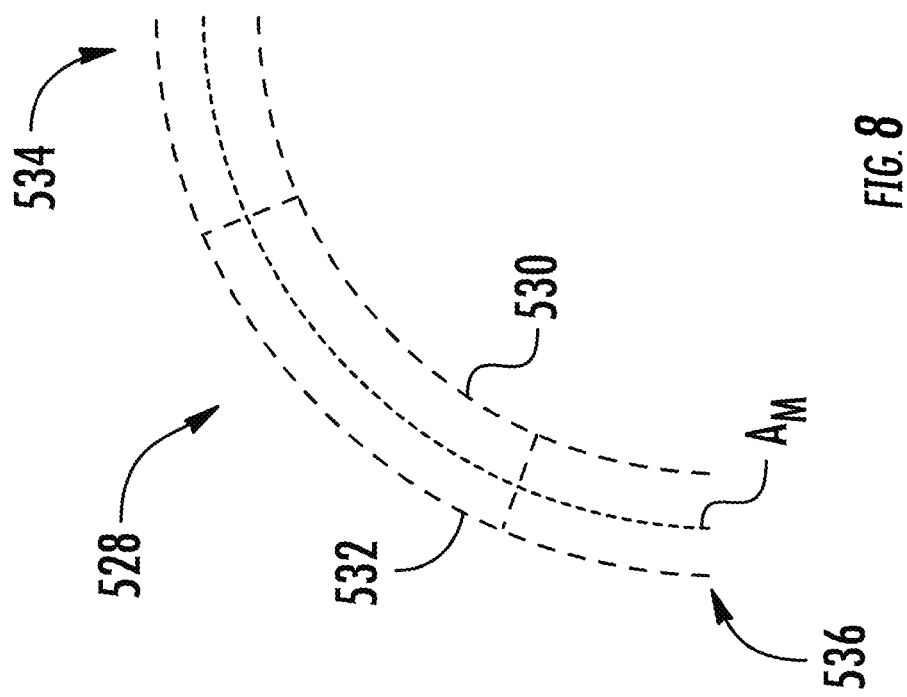
FIG. 8 illustrates a close-up view of certain portion of the assembled reinforcement member of FIG. 7 according to the present disclosure.

As particularly depicted in FIGS. 6-8, in an embodiment, a midline reference curve ($C_M$) may be defined for each layer of the tower structure 500. The midline reference curve ($C_M$) may be equidistant between the outer circumferential face 508 and the inner circumferential face 510 for the layer. Accordingly, the midline reference curve ($C_M$) may be generally circular, and at least partially circumscribing the vertical axis. It should be appreciated that the midline reference curve ($C_M$) may represent a radial neutral point corresponding to the width/thickness (W) of the wall 502.

It also should be appreciated that the midline reference curves ($C_M$) of the print layers of the wall 502 may have different actual midline perimeter lengths at various heights of the tower structure 500. For example, the tower structure 500 may taper with an increase in height. As a result, a midline reference curve ($C_M$) of a print layer near the support surface 4 may have a greater actual midline perimeter length than the actual midline perimeter length of a midline reference curve ($C_M$) adjacent the ultimate height of the tower structure 500.

As particularly depicted in FIG. 8, in an embodiment, the reinforcement member 514 may include a plurality of prefabricated reinforcement segments 528. For example, in an embodiment, the reinforcement member 514 may include three prefabricated reinforcement segments 528, with each prefabricated reinforcement segment 528 covering a 120-degree arc of the midline reference curve ($C_M$). In an additional embodiment, the reinforcement member 514 may include four prefabricated reinforcement segments 528, with each prefabricated reinforcement segment 528 covering a 90-degree arc of the midline reference curve ($C_M$). In a further embodiment, the reinforcement member 514 may include six prefabricated reinforcement segments 528, with each prefabricated reinforcement segment 528 covering a 60-degree arc of the midline reference curve ($C_M$). It should, therefore, be appreciated that in an embodiment, forming the reinforcement member 514 may include receiving the plurality of prefabricated reinforcement segments 528.

Each of the plurality of prefabricated reinforcement segments 528 may, in an embodiment, include an inner rail segment 530 coupled to an outer rail segment 532 via a portion of the plurality of transverse members 522. Each of the plurality of prefabricated reinforcement segments 528 may have a first segment end 534 and a second segment end 536 opposite thereof. The first segment end 534 and the second segment end 536 may be defined by the inner and outer rail segments 530, 532. In another embodiment, each of the plurality of prefabricated reinforcement segments 528 of the tower structure 500 may be pre-formed with/manufactured to a fixed length (e.g., arc length).

In an embodiment, each of the plurality of prefabricated reinforcement segments 528 or the reinforcement member 514 generally may include a lifting interface. The lifting interface may be configured to couple to at least one lifting element in order to facilitate the positioning of the fully assembled reinforcement member 514 on the first printed layer 512. The lifting interface may be a flexible element configured to translate from a generally vertical orientation to a generally horizontal orientation or anywhere in between when the reinforcement member 514 is positioned on the first printed layer 512 and the lifting element(s) is decoupled. For example, in an embodiment, the lifting interface may be a cable, a hinged element, and/or a deformable plate element.

In another embodiment, the lifting element(s) may operate to establish a separation or gap between the reinforcement member(s) 514 or the prefabricated reinforcement segments 528 relative to the first printed layer 512 when the reinforcement members 514 or components are being placed or positioned thereon. Following the placement or positioning of the reinforcement members 514 or components on the first printed layer 512, the lifting element(s) may be released or release may be delayed to allow for hardening or curing of the cementitious material, for example. Accordingly, the lifting element(s) may be separated from the reinforcement member(s) 514 or the prefabricated reinforcement segments 528 while the separation or gap is maintained relative to the first printed layer 512. The lifting element(s) also may remain engaged to and holding the reinforcement member(s) 514 or the prefabricated reinforcement segments 528 while the separation or gap is maintained relative to the first printed layer 512 as a new print layer is being deposited.

By at least maintaining the separation or gap between the reinforcement member(s) 514 or the prefabricated reinforcement segments 528 and the first printed layer 512, premature damage to recently printed layers may be precluded. Precluding contact between the reinforcement member(s) 514 or the prefabricated reinforcement segments 528 and the cementitious material 506 of the first printed layer 512, which may remain soft/uncured during the positioning of the reinforcement members or components, may mitigate/preclude damage to the first printed layer 512, while allowing the reinforcement members or components to be precisely placed and positioned within a new printer layer. It should be appreciated that precluding damage to the first printed layer 512 may increase the structural integrity of the tower structure 500 relative to that obtainable in the presence of a damaged first printed layer 512.

Returning to FIG. 6, in an embodiment, the additive printing system 300 may include a support structure 304. The support structure 304 may extend from the ground and/or from the support surface 4 along a generally vertical direction (V). In an embodiment, the support structure 304 may include at least one vertical support component 306. As depicted, in an embodiment, the vertical support component(s) 306 may be located radially outward of the tower structure 500. However, in an additional embodiment, the vertical support component(s) 306 may be located radially inward of the wall 502 or supported above and over the wall (as shown in the embodiment of FIGS. 3-5, for example).

The vertical support component(s) 306 may, in an embodiment, support a horizontal support component 308. The vertical support component(s) 306 and the horizontal support component 308 may, in an embodiment, be a truss-like structure (e.g., similar to a tower crane). However, the vertical support component(s) 306 and the horizontal support component 308 may be formed in the other suitable manner or have any other configuration according to alternative embodiments. The horizontal support component 308 may, in an embodiment, be rotatable about the vertical support component(s) 306. In an additional embodiment, the horizontal support component 308 may be movably coupled to the vertical support component(s) 306 so as to permit the horizontal support component 308 to move in the vertical direction (V).

In at least one embodiment, the vertical support component(s) 306 may be configured to have a height that increases in step with the tower structure 500 during the manufacturing thereof. In such an embodiment, additional segments may be combined with the vertical support component(s) 306 to raise the vertical support structure using a jacking system (for example, similar to that shown in the embodiment of FIGS. 3-5). In general, the jacking system may be positioned proximate the support surface 4 and may be configured for raising the vertical support component(s) 306 and inserting additional segments.

The support structure 304 may be configured to support at least one support arm 310 movably coupled thereto. The support arm(s) 310 may be configured to position at least one component of the additive printing system 300 adjacent to the tower structure 500. The support arm(s) 310 may also be configured to deliver power, air, cementitious material, form material, or other resources to the supported component. In an additional embodiment, the support arm(s) 310 may also be equipped with at least one optical sensor 334 (see FIG. 9) for detecting a position of the support arm(s) 310 relative to the tower structure 500.

The additive printing system 300 may include the printhead assembly 302 supported by the support structure 304. The printhead assembly 302 may be positioned over the support surface 4 or preceding layers of the wall 502 by at least one of the horizontal support component 308 and/or the support arm(s) 310. The printhead assembly 302 may include a print nozzle 312. The print nozzle 312 may be configured to direct and/or shape a flow of cementitious material 506 during the additive printing of the tower structure 500.

Figure 9:
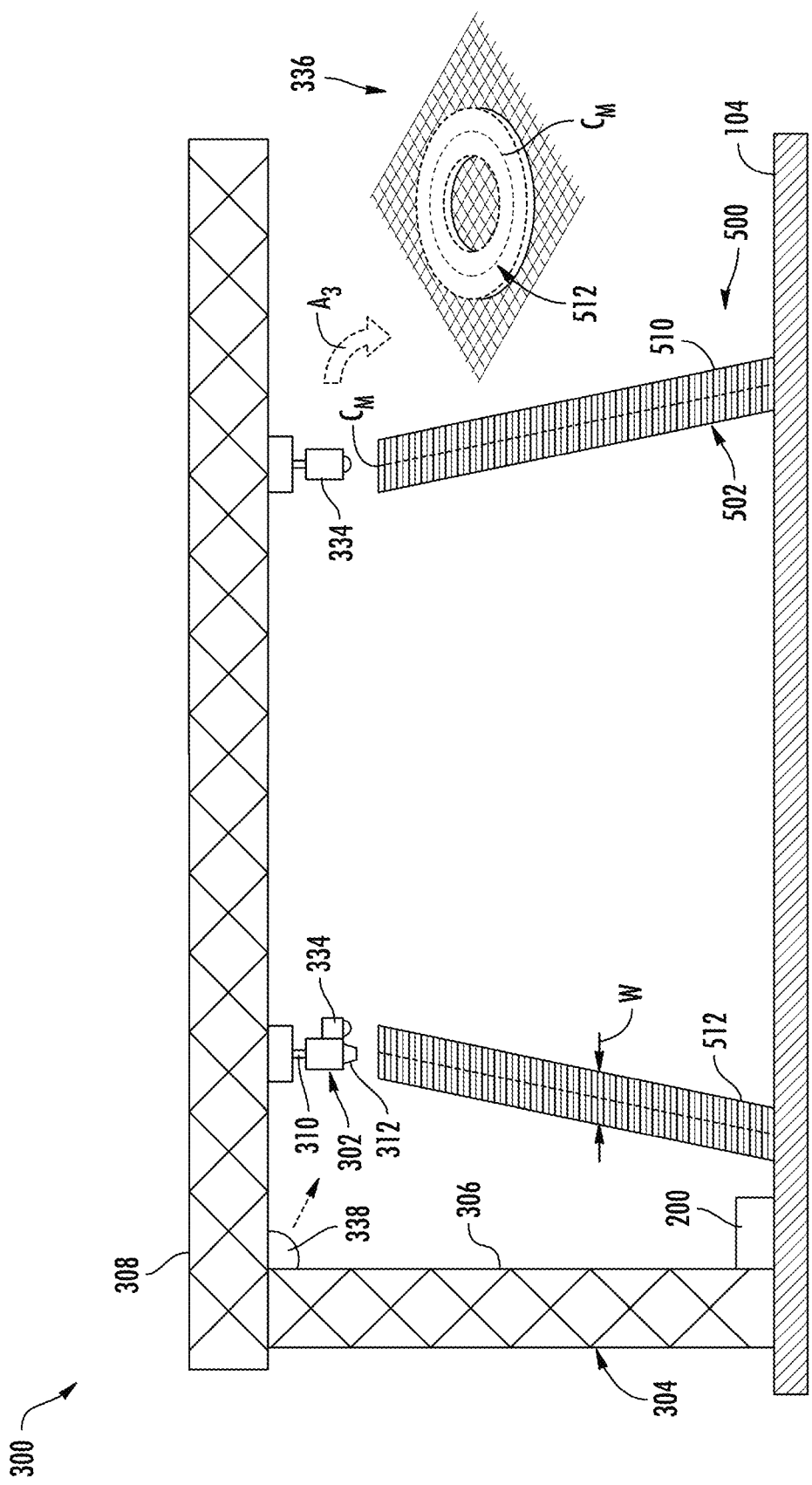
FIG. 9 illustrates a side perspective view of certain components of the additive printing system of FIG. 6 according to the present disclosure.

As particularly depicted in FIG. 9, the optical sensor(s) 334 may be a three dimensional scanner. In another embodiment, the optical sensor(s) 334 may be a non-contact scanner that utilizes cameras (e.g., a stereoscopic system) and/or lasers (e.g., a triangulation-based 3D laser scanner) to capture physical characteristics of the tower structure 500. In another embodiment, the optical sensor(s) 334 may comprise an image sensor (e.g., a camera or video sensor) and may be configured to leverage processor-based algorithmic models, machine learning, or convolutional neural networks to derive information from digital images, videos, and other visual inputs and to take actions or make recommendations based on that information. Moreover, the at least one optical sensor 334 may be integrated with the printhead assembly 302. However, in an additional embodiment, the optical sensor(s) 334 may be an independent element supported by the support structure 304.

Following the deposition of the first printed layer 512 and placement and positioning of the reinforcement member(s) 514, the optical sensor(s) 334 may, in an embodiment, be employed to optically scan the printed layer being deposited over the reinforcement member(s) 514. Thus, in an embodiment, a controller 400 (see FIG. 13) may then generate (as depicted by arrow $A_2$) a three-dimensional map 336 of the printed layer being deposited, based on the optical scan. In addition, the controller 400 may, in an embodiment, determine the actual midline perimeter length of the first printed layer 512 based on the three-dimensional map 336 of the first printed layer 512.

In another embodiment, the controller 400 may, in an embodiment, record the actual physical dimensions and the particular placement, positioning, and orientation of the first reinforcement member(s) before and during an actual print path 332 of the printhead assembly 302. The actual print path 332 may be recorded by the controller 400 during deposition of a second printed layer 516 going over the first printed layer 512. For example, in an embodiment, the sensor(s) 334 may be utilized to continuously monitor the placement and positioning of the first reinforcement member(s) and the second printed layer 516. In an embodiment, a midline perimeter length needed for the second reinforcement member(s) may be determined. The second reinforcement member(s) may then be formed based, at least in part, on the actual midline perimeter which itself is based on the determined, tracked, and mapped position of the first reinforcement member(s).

Figure 10:
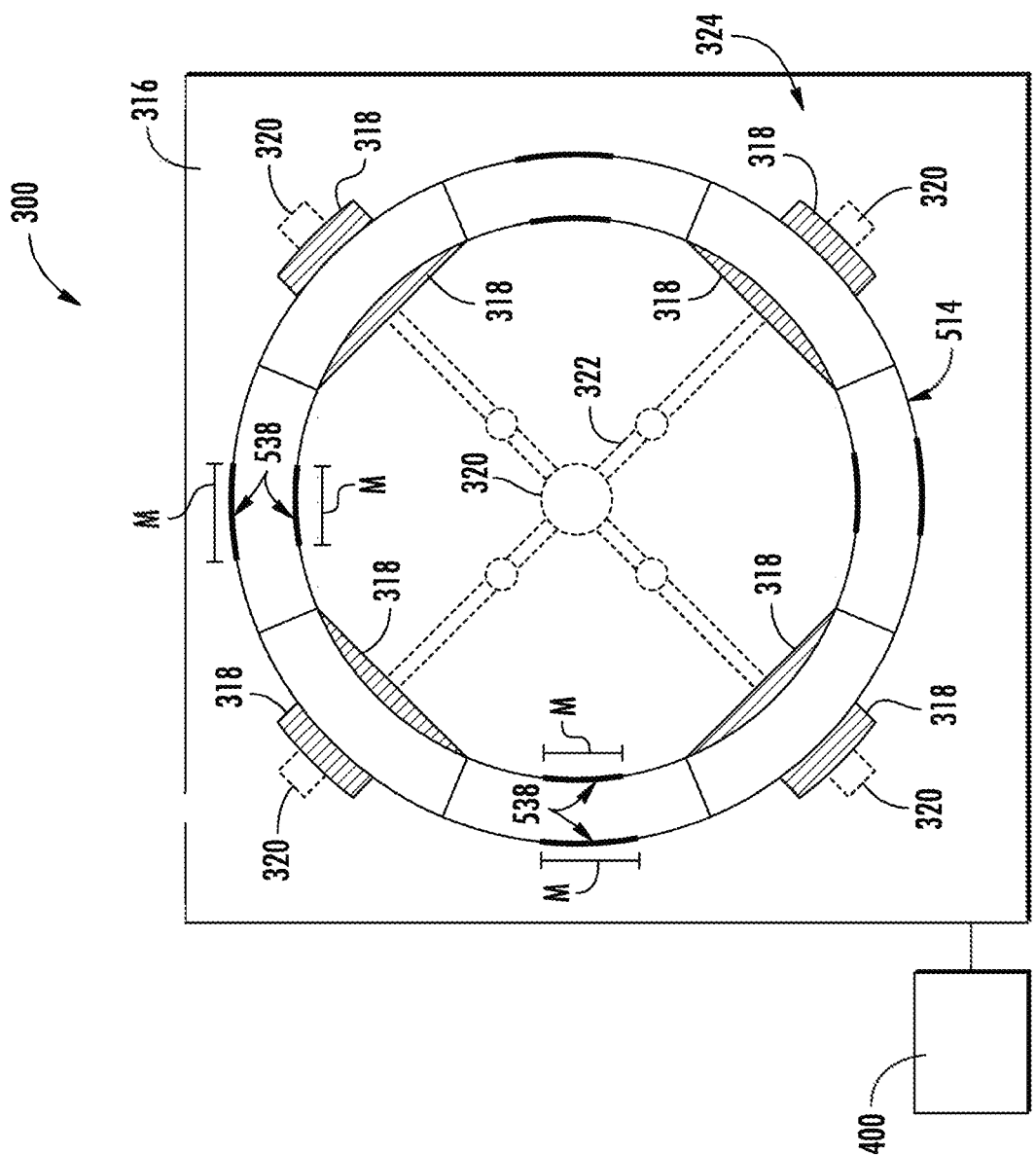
FIG. 10 illustrates a top plan view of certain other components of the additive printing system of FIG. 6.

As depicted in FIG. 10, in an embodiment, the additive printing system 300 may include a jig table 316. The jig table 316 may be positioned on the ground/support surface 4 at the installation location of the tower structure 500. For example, the jig table 316 may be positioned adjacent to the tower structure 500. The jig table 316 may be configured to receive the plurality of prefabricated reinforcement segments 528. In an embodiment, the jig table 316 may be sized to support the reinforcement member 514 when fully formed.

The jig table 316 may, in an embodiment, include a plurality of movable stops 318. The plurality of movable stops 318 may, for example, be configured to orient/position the plurality of prefabricated reinforcement segments 528 in order to form the reinforcement member(s) 514 used throughout the tower structure 500. Accordingly, in an embodiment, the plurality of movable stops 318 may be positioned based on the reinforcement member midline perimeter length. At least a portion of the plurality of prefabricated reinforcement segments 528 may be positioned via the plurality of movable stops 318.

In an embodiment, the jig table 316 may include at least one servo 320. The servo(s) 320 may be operably coupled to a portion of the plurality of movable stops 318, such as via a linkage 322. In such an embodiment, the servo(s) 320 may be actuated in order to alter a location of at least one of the plurality of movable stops 318 relative to a support surface 324 of the jig table 316. The jig table 316 may be communicatively coupled to the controller 400 in an embodiment. In such an embodiment, the controller 400 of the additive printing system 300 may determine a required position for each of the plurality of movable stops 318.

Figure 11:
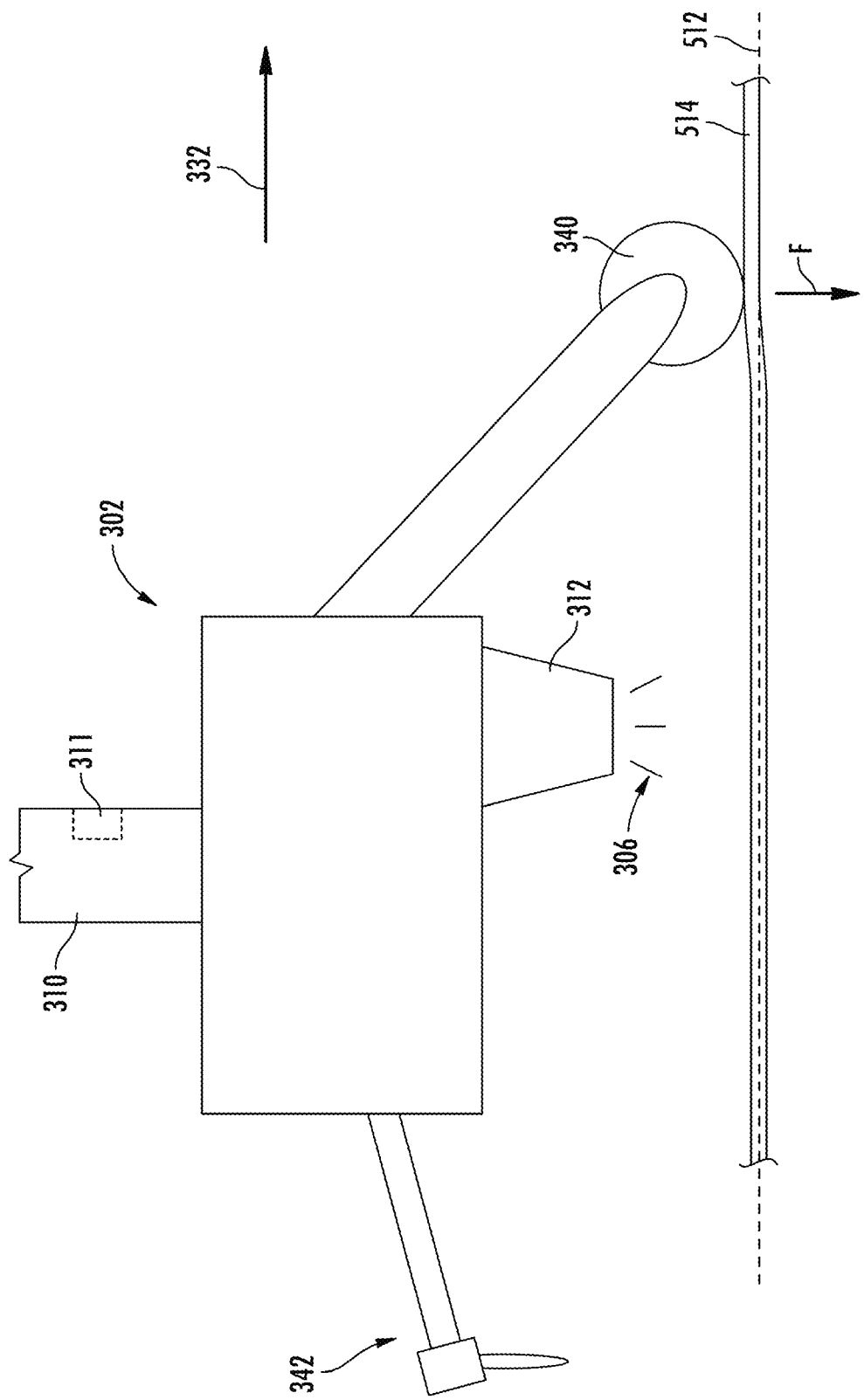
FIG. 11 illustrates a side view of certain other components of the additive printing system of FIG. 6.

Referring now to FIGS. 9 and 11, in an embodiment, the additive printing system 300 may include at least one laser emitter 338. The laser emitter(s) 338 may be supported by the support structure 304 and/or the support arm(s) 310. In an embodiment, the laser emitter(s) 338 may project at least one placement guide onto the first printed layer 512 or the second printer layer. The placement guide(s) may be configured to facilitate the positioning of the reinforcement member 514 on the first printed layer 512 or the second printed layer 516. The placement guide(s) may, for example, be an illuminated ring, a plurality of alignment marks, an orientation point, and/or other similar features.

Referring now to FIG. 11, in an embodiment, the printhead assembly 302 may include an actuatable roller 340. The actuatable roller 340 may be positioned to precede the print nozzle 312 during a deposition operation. In other words, the actuatable roller 340 may proceed along the print path 332 in advance of the print nozzle 312.

Following the positioning of the reinforcement member 514 on the first printed layer 512, the actuatable roller 340 may, in an embodiment, be utilized to exert a downward force (F) on the reinforcement member 514. In response to the downward force (F), the reinforcement member 514 may be embedded at least partially within the first printed layer 512. It should be appreciated that embedding the reinforcement member 514 at least partially within the first printed layer 512 while the cementitious material 506 remains soft/uncured may mitigate an impact of the reinforcement member 514 on the second printed layer 516, and any subsequent print layers of the wall 502.

Figure 12:
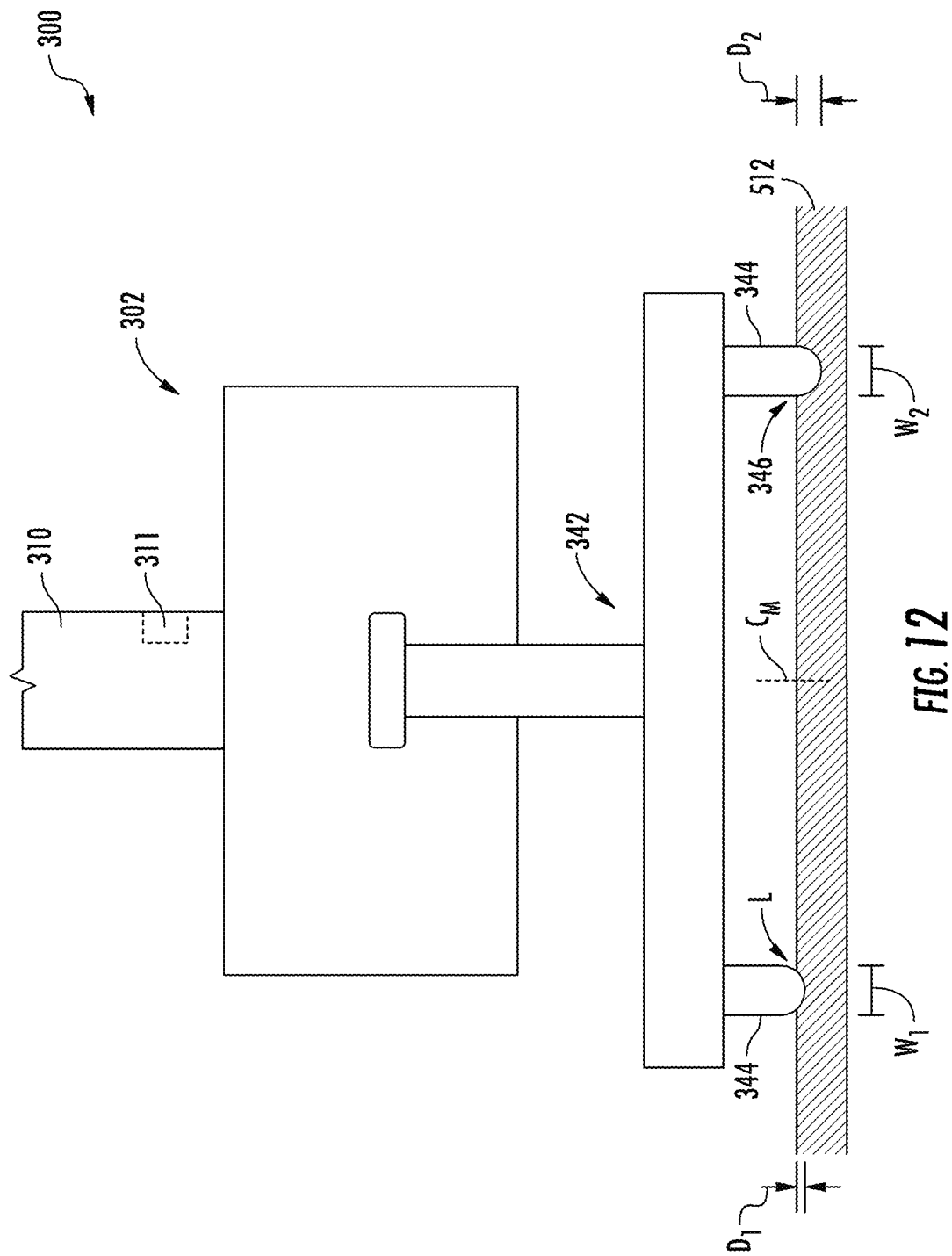
FIG. 12 illustrates a side view of certain other components of the additive printing system of FIG. 6.

Referring to FIGS. 11 and 12, in an embodiment, the printhead assembly 302 may include an actuatable groover 342. The actuatable groover 342 may be positioned to trail the print nozzle 312. In an embodiment, the actuatable groover 342 may include at least one grooving element 344. The grooving element(s) 344 may be configured to form at least one depression/recess in an upper surface of the first printed layer 512 or the second printed layer 516. Accordingly, in an embodiment, the actuatable groover 342 may be positioned in contact with a portion of the wet cementitious material 506 of the first printed layer 512. In an embodiment, the actuatable groover 342 may be utilized to develop the depression/recess in the portion of the wet cementitious material 506 of the first printed layer 512.

In an embodiment, the actuatable groover 342 may be utilized to form a positioning line (L) in the portion of the wet cementitious material 506. The positioning line (L) may be configured to facilitate the accurate placement of the reinforcement member 514 on the first printed layer 512. Accordingly, the positioning line (L) may have a cross-sectional depth ($D_1$) that is less than a cross-sectional maximal width ($W_1$). The cross-sectional maximal width ($W_1$) may, for example, correspond to the maximal diameter of the inner and/or outer rail 518, 520. It should be appreciated that the cross-sectional depth ($D_1$) being less than a cross-sectional maximal width ($W_1$) may facilitate the positioning of a majority of the reinforcement member 514 above an upper surface of the first printed layer 512.

As depicted in FIG. 12, in an embodiment, the actuatable groover 342 may include at least two grooving elements 344. The grooving elements 344 may be utilized by the additive printing system 300 to form at least two parallel receiving grooves 346 (a single receiving groove 346 is depicted in FIG. 9 for purposes of illustration) in the first printed layer 512. The parallel receiving grooves 346 may be configured to receive at least the inner and outer rail 518, 520 of the reinforcement member 514. In an embodiment, each of the receiving grooves 346 may have a cross-sectional width ($W_2$) that corresponds to a cross-sectional width of the respective inner and outer rails 518, 520. Each of the receiving grooves 346 may, in an embodiment, have a cross-sectional depth ($D_2$) configured to at least partially embed the reinforcement member 514 in the first printed layer 512.

As depicted particularly in FIG. 11, in an embodiment, the additive printing system 300 may include both the actuatable roller 340 and the actuatable groover 342. In such an embodiment, the actuatable groover 342 may be positioned to engage the first printed layer 512 during the deposition thereof (as depicted in FIG. 12). Following the deposition of the first printed layer 512, a separation may be established (as depicted in FIG. 8) between the grooving element(s) 344 and the wet cementitious material 506. The reinforcement member 514 may then be positioned in contact with the resultant positioning line (L) or parallel receiving grooves 346. With the reinforcement member 514 accurately positioned on the first printed layer 512, the actuatable roller 340 may be positioned in contact with the reinforcement member 514 in order to at least partially embed the reinforcement member 514 in the first printed layer 512. In conjunction with the exertion of the downward force (F) by the actuatable roller 340, the printhead assembly may deposit a portion of cementitious material 506 to print the second printed layer 516.

Figure 13:
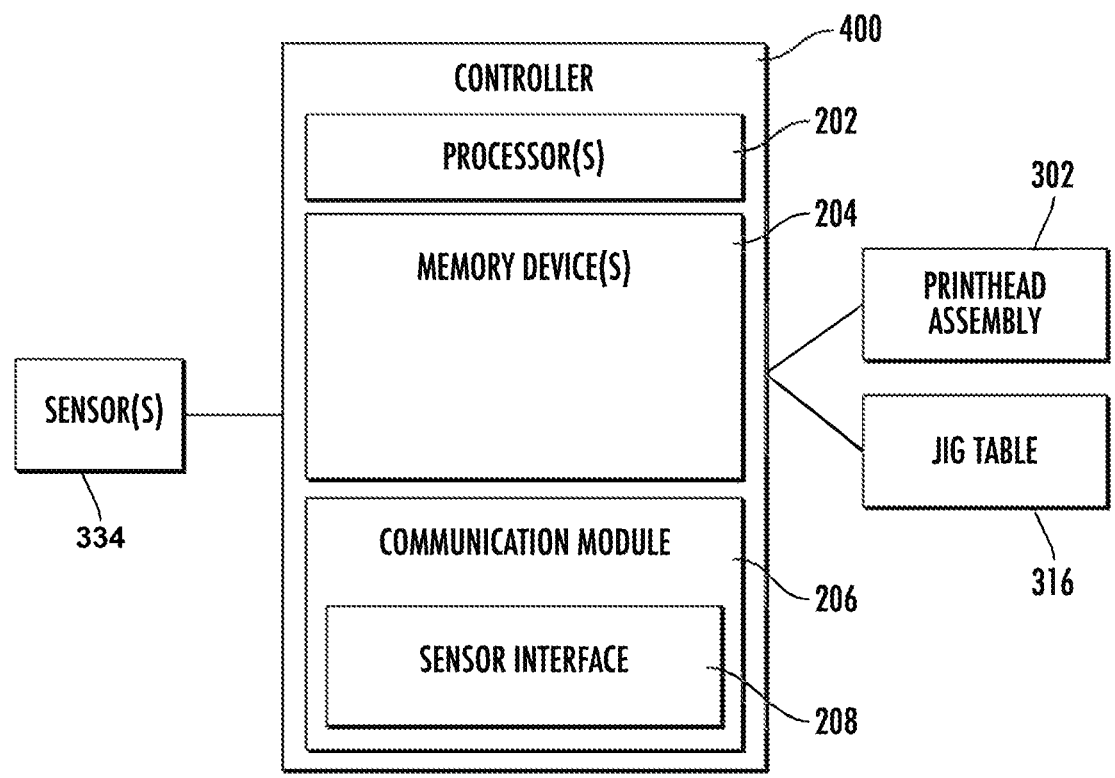
FIG. 13 illustrates a block diagram of an embodiment of a controller of an additive printing system according to the present disclosure.

Referring now to FIG. 13, a schematic diagram of an embodiment of suitable components of the controller 400 that may control the additive printing system 300 according to the present disclosure is illustrated. For example, as shown, the controller 400 may include one or more processor(s) 202 and associated memory device(s) 204 configured to perform a variety of computer-implemented functions (e.g., performing the methods, steps, calculations and the like and storing relevant data as disclosed herein). Additionally, the controller 400 may also include a communications module 206 to facilitate communications between the controller 400 and the various components of the additive printing system 300. Further, the communications module 206 may include a sensor interface 208 (e.g., one or more analog-to-digital converters) to permit signals transmitted from one or more sensors to be converted into signals that can be understood and processed by the processors 202. It should be appreciated that the sensor(s) may be communicatively coupled to the communications module 206 using any suitable means, such as a wired or a wireless connection. Additionally, the communications module 206 may also be operably coupled to a component of the additive printing system 300 so as to orchestrate the formation of the tower structure 500.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 400 to perform various functions including, but not limited to, manufacturing a tower structure, as described herein, as well as various other suitable computer-implemented functions.

In particular, in an embodiment, the communications module 206 may include a sensor interface 208 comprising one or more analog-to-digital converters to permit signals transmitted from one or more sensors or feedback devices to be converted into signals that can be understood and processed by the processor(s) 202. It should be appreciated that these sensors may be communicatively coupled to the communications module 206 using any suitable means, e.g., via a wired or wireless connection using any suitable wireless communications protocol known in the art. The processor 202 may also be configured to compute advanced control algorithms and communicate to a variety of Ethernet or serial-based protocols (Modbus, OPC, CAN, etc.).

Referring now to FIG. 14, a flow diagram of an embodiment of a method 600 of manufacturing a tower structure is provided. In particular, the method 600 can be used to form the tower structure 500 of FIGS. 2-12 using the additive printing system 40 of FIGS. 3-5 or the additive printing system 300 of FIG. 6-12, or to form any other suitable structure, tower, or tall structure using any other suitable additive printing device. In this regard, for example, the controller 400 of FIG. 13 may be configured for implementing the method 600. However, it should be appreciated that the method 600 is discussed herein only to describe aspects of the present disclosure and is not intended to be limiting.

Further, though FIG. 14 depicts a control method having steps performed in a particular order for purposes of illustration and discussion, those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of the methods are explained with respect to the tower structure 500 and the additive printing device 40, 300 as an example, it should be appreciated that these methods may be applied to the operation of additive printing device to form any suitable tower structure.

In particular, as shown at (602), the method 600 includes depositing, via a printhead assembly 42 of an additive printing system 40, one or more first printed layers 512 of a wall 502 of a tower structure 500. The one or more first printed layers 512 may at least partially circumscribing a vertical axis $V_A$ of the tower structure 500.

As shown at (604), the method 600 also includes positioning a first reinforcement member 514 with respect to the one or more first printed layers 512 of the wall 502. In certain embodiments, the method 600 may include depositing, via the additive printing system 40, a second printed layer 516 of the wall 502 with the printhead assembly 42 on the first reinforcement member 514, the second printed layer configured to hold a second reinforcement member thereon. In certain embodiments, the method 600 also may include placing (distinguished from "positioning" herein) a second reinforcement member on the second printed layer.

As shown at (606), the method 600 also includes determining, via an optical sensor 334 of the additive printing system 40, a position for placing a second reinforcement member based on a position of the first reinforcement member 514 with respect to the one or more first printed layers 512. In certain embodiments, the method 600 may include optically scanning, via the optical sensor 334, the physical dimensions and the particular, placement, positioning, and orientation of the reinforcement member(s) 514. In certain embodiments, the method 600 may include tracking and mapping the physical dimensions and the particular, placement, positioning, and orientation of the reinforcement member(s) 514.

Moreover, in certain embodiments, the method 600 may include screening and selecting from amongst various reinforcement members for the best fit or most applicable second reinforcement member(s), with respect to the one or more first printed layers 512 of the wall 502 of the tower structure 500. In certain embodiments, the method 600 also may include custom forming or designing (digitally, using a digital twin, for example, or physically) the second reinforcement member(s). In certain embodiments, the method 600 also may include placing or positioning the second reinforcement member(s) relative to the first reinforcement member(s) 514, or relative the one or more first printed layers 512, before additional printed layer(s) are added on top.

Optionally, as shown at (608), the method 600 may also include positioning the second reinforcement member on the second printed layer 516 in the determined position. In certain embodiments and optionally as shown at (610), the method 600 also may include depositing, via the additive printing system, a third printed layer of the wall with the printhead assembly on the second reinforcement member.

Further aspects of the present disclosure are provided by the subject matter of the following clauses:

Clause 1. A method of manufacturing a tower structure, the method comprising:
depositing, via a printhead assembly of an additive printing system, one or more first printed layers of a wall of the tower structure;
positioning a first reinforcement member with respect to the one or more first printed layers of the wall; and
determining, via an optical sensor of the additive printing system, a position for placing a second reinforcement member based on a position of the first reinforcement member with respect to the one or more first printed layers.

Clause 2. The method of clause 1, further comprising creating, via a controller of the additive printing system, a visual representation or a digital map of the tower structure based, at least in part, on the determined position of the first reinforcement member with respect to the one or more first printed layers.

Clause 3. The method of claim 2, further comprising forming a second reinforcement member based, at least in part, on the visual representation or the digital map of the tower structure.

Clause 4. The method of any of the preceding clauses, further comprising:
determining, via a controller of the additive printing system, an actual midline perimeter length of the first printed layer; and
forming a second reinforcement member based, at least in part, on the determined actual midline perimeter length.

Clause 5. The method of clause 4, further comprising:
positioning the second reinforcement member on the first printed layer; and
depositing, via the printhead assembly of the additive printing system, a second printed layer of the wall on the second reinforcement member.

Clause 6. The method of any of clauses 1-5, further comprising:
depositing, via the printhead assembly of the additive printing system, a second printed layer of the wall on the first reinforcement member, the second printed layer configured to hold a second reinforcement member thereon; and
positioning the second reinforcement member on the second printed layer in the determined position.

Clause 7. The method of clause 6, the method further comprising:
depositing, via the printhead assembly of the additive printing system, a third printed layer of the wall on the second reinforcement member, the third printed layer configured to hold a third reinforcement member; and
determining, via the optical sensor of the additive printing system, a position for placing the third reinforcement member based on one of more of the first reinforcement member positioning and the second reinforcement member positioning.

Clause 8. A method of manufacturing a tower structure, the method comprising:
depositing, via a printhead assembly of an additive printing system, a first printed layer of a wall, the wall at least partially circumscribing a vertical axis of the tower structure;
positioning a first reinforcement member on the first printed layer;
depositing, via the printhead assembly of the additive printing system, a second printed layer of the wall on the first reinforcement member;
placing a second reinforcement member on the second printed layer;
determining, via an optical sensor of the additive printing system, a position for placing the second reinforcement member based on the first reinforcement member positioning;
positioning the second reinforcement member on the second printed layer in the determined position; and
depositing, via the printhead assembly of the additive printing system, a third printed layer of the wall on the second reinforcement member.

Clause 9. The method of clause 8, wherein the third print layer is configured to hold a third reinforcement thereon, and wherein the method further comprises:
determining, via the optical sensor of the additive printing system, a position for placing a third reinforcement member based on one of more of the first reinforcement member positioning, the determined position, and the second reinforcement member positioning.

Clause 10. The method of any of clauses 8-9, wherein determining the position for placing the second reinforcement member comprises creating, via a controller of the additive printing system, a visual representation or a digital map of the tower structure based, at least in part, on one of more of the first reinforcement member positioning, the determined position, and the second reinforcement member positioning.

Clause 11 The method of any of clauses 8-10, further comprising forming a second reinforcement member based, at least in part, on the visual representation or the digital map of the tower structure.

Clause 12. The method of clause 8, further comprising:
determining, via a controller of the additive printing system, an actual midline perimeter length of the first printed layer; and
forming a second reinforcement member based, at least in part, on the determined actual midline perimeter length.

Clause 13. An additive printing system for manufacturing a tower structure, the additive printing system comprising:
a support structure;
an optical sensor;
a printhead assembly operably coupled to the support structure; and
a controller communicatively coupled to the printhead assembly and the optical sensor, the controller including at least one processor configured to perform or direct a plurality of operations, the plurality of operations comprising:
depositing a first printed layer of a wall with the printhead assembly;
optically scanning the first printed layer, via the optical sensor, during depositing of the first printed layer by the printhead assembly;
depositing a second printed layer of the wall with the printhead assembly atop the first printed layer, the first printed layer including a first reinforcement member, the second printed layer configured to hold a second reinforcement member thereon;
generating a three-dimensional map of the first printed layer based on the optical scan; and
determining a position for placing the second reinforcement member based on the three-dimensional map of the first printed layer.

Clause 14. The system of clause 13, wherein the plurality of operations further comprise positioning the second reinforcement member on the second printed layer in the determined position.

Clause 15. The system of any of clauses 13-14, wherein the plurality of operations further comprise:

depositing, with the printhead assembly, a third printed layer of the wall on the second reinforcement member, the third print layer configured to hold a third reinforcement member thereon;

generating a three-dimensional map of the second printed layer based on the optical scan; and determining a position for placing the third reinforcement member based on one of more of the three-dimensional map of the first printed layer and the three-dimensional map of the second printed layer.

Clause 16. The system of clause 15, wherein the plurality of operations further comprise determining, via the optical sensor of the additive printing system, a position for placing the third reinforcement member based on one of more of the first reinforcement member positioning, the determined position, and the second reinforcement member positioning.

Clause 17. The method of any of clauses 13-16, wherein the plurality of operations further comprise:

determining an actual midline perimeter length of the first printed layer; and forming the second reinforcement member based, at least in part, on the determined actual midline perimeter length.

Clause 18. The system of clause 17, wherein the plurality of operations further comprise positioning the second reinforcement member on the first printed layer.

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing a tower structure, the method comprising:

depositing, via a printhead assembly of an additive printing system, one or more first printed layers of a wall of the tower structure;

positioning a first reinforcement member with respect to the one or more first printed layers of the wall; and determining, via an optical sensor of the additive printing system, a position for placing a second reinforcement member based on a position of the first reinforcement member with respect to the one or more first printed layers.

2. The method of claim 1, further comprising creating, via a controller of the additive printing system, a visual representation or a digital map of the tower structure based, at least in part, on the determined position of the first reinforcement member with respect to the one or more first printed layers.

3. The method of claim 2, further comprising forming or positioning the second reinforcement member on the one or more first printed layers based, at least in part, on the visual representation or the digital map of the tower structure.

4. The method of claim 1, further comprising:

determining, via a controller of the additive printing system, an actual midline perimeter length of the one or more first printed layers; and forming a second reinforcement member based, at least in part, on the determined actual midline perimeter length.

5. The method of claim 4, further comprising:

positioning the second reinforcement member on the one or more first printed layers; and depositing, via the printhead assembly of the additive printing system, a second printed layer of the wall on the second reinforcement member.

6. The method of claim 3, further comprising:

depositing, via the printhead assembly of the additive printing system, a second printed layer of the wall on the first reinforcement member, the second printed layer configured to hold the second reinforcement member thereon; and positioning the second reinforcement member on the second printed layer in the determined position.

7. The method of claim 6, the method further comprising:

depositing, via the printhead assembly of the additive printing system, a third printed layer of the wall on the second reinforcement member, the third printed layer configured to hold a third reinforcement member; and determining, via the optical sensor of the additive printing system, a position for placing the third reinforcement member based on one of more of the first reinforcement member positioning and the second reinforcement member positioning.

8. A method of manufacturing a tower structure, the method comprising:

depositing, via a printhead assembly of an additive printing system, a first printed layer of a wall of the tower structure;

positioning a first reinforcement member on the first printed layer;

depositing, via the printhead assembly of the additive printing system, a second printed layer of the wall on the first reinforcement member;

placing a second reinforcement member on the second printed layer;

determining, via an optical sensor of the additive printing system, a position for placing the second reinforcement member based on the first reinforcement member positioning;

positioning the second reinforcement member on the second printed layer in the determined position; and depositing, via the printhead assembly of the additive printing system, a third printed layer of the wall on the second reinforcement member.

9. The method of claim 8, wherein the third print layer is configured to hold a third reinforcement thereon, and wherein the method further comprises:

determining, via the optical sensor of the additive printing system, a position for placing a third reinforcement member based on one of more of the first reinforcement member positioning, the determined position, and the second reinforcement member positioning.

10. The method of claim 8, wherein determining the position for placing the second reinforcement member comprises creating, via a controller of the additive printing system, a visual representation or a digital map of the tower structure based, at least in part, on one of more of the first reinforcement member positioning, the determined position, and the second reinforcement member positioning.

11. The method of claim 10, further comprising forming a second reinforcement member based, at least in part, on the visual representation or the digital map of the tower structure.

12. The method of claim 8, further comprising:
  determining, via a controller of the additive printing system, an actual midline perimeter length of the first printed layer; and
  forming a second reinforcement member based, at least in part, on the determined actual midline perimeter length.

13. An additive printing system for manufacturing a tower structure, the additive printing system comprising:
  a support structure;
  an optical sensor;
  a printhead assembly operably coupled to the support structure; and
  a controller communicatively coupled to the printhead assembly and the optical sensor, the controller comprising at least one processor configured to perform or direct a plurality of operations, the plurality of operations comprising:
  depositing a first printed layer of a wall with the printhead assembly;
  optically scanning the first printed layer, via the optical sensor, during depositing of the first printed layer by the printhead assembly;
  depositing a second printed layer of the wall with the printhead assembly atop the first printed layer, the first printed layer comprising a first reinforcement member, the second printed layer configured to hold a second reinforcement member thereon;
  generating a three-dimensional map of the first printed layer based on the optical scan; and
  determining a position for placing the second reinforcement member based on the three-dimensional map of the first printed layer.

14. The additive printing system of claim 13, wherein the plurality of operations further comprise positioning the second reinforcement member on the second printed layer in the determined position.

15. The additive printing system of claim 14, wherein the plurality of operations further comprise:
  depositing, with the printhead assembly, a third printed layer of the wall on the second reinforcement member, the third print layer configured to hold a third reinforcement member thereon;
  generating a three-dimensional map of the second printed layer based on the optical scan; and
  determining a position for placing the third reinforcement member based on one of more of the three-dimensional map of the first printed layer and the three-dimensional map of the second printed layer.

16. The additive printing system of claim 15, wherein the plurality of operations further comprise determining, via the optical sensor of the additive printing system, a position for placing the third reinforcement member based on one of more of the first reinforcement member positioning, the determined position, and the second reinforcement member positioning.

17. The additive printing system of claim 13, wherein the plurality of operations further comprise:
  determining an actual midline perimeter length of the first printed layer; and
  forming the second reinforcement member based, at least in part, on the determined actual midline perimeter length.

18. The additive printing system of claim 17, wherein the plurality of operations further comprise positioning the second reinforcement member on the first printed layer.

* * * * *